US009292522B2

(12) United States Patent
Shyryayev

(10) Patent No.: US 9,292,522 B2
(45) Date of Patent: Mar. 22, 2016

(54) METHOD AND SYSTEM FOR AUTOMATING THE EDITING OF COMPUTER FILES

(71) Applicant: Dmytro Shyryayev, Windsor (CA)

(72) Inventor: Dmytro Shyryayev, Windsor (CA)

( * ) Notice: Subject to any disclaimer, the term of this patent is extended or adjusted under 35 U.S.C. 154(b) by 414 days.

(21) Appl. No.: 14/044,603

(22) Filed: Oct. 2, 2013

(65) Prior Publication Data

US 2014/0101181 A1   Apr. 10, 2014

Related U.S. Application Data

(60) Provisional application No. 61/709,739, filed on Oct. 4, 2012.

(51) Int. Cl.
  *G06F 7/00*   (2006.01)
  *G06F 17/30*   (2006.01)

(52) U.S. Cl.
  CPC .... *G06F 17/30076* (2013.01); *G06F 17/30914* (2013.01)

(58) Field of Classification Search
  CPC ..................... G06F 17/30076; G06F 17/30914
  USPC .................................................. 707/771–790
  See application file for complete search history.

(56) References Cited

U.S. PATENT DOCUMENTS

| 5,317,509 A * | 5/1994 | Caldwell ................. G06F 8/425 704/9 |
| 2002/0065857 A1 * | 5/2002 | Michalewicz ...... G06F 17/3071 715/259 |
| 2007/0234288 A1 * | 10/2007 | Lindsey .................. G06F 8/437 717/117 |
| 2009/0030671 A1 * | 1/2009 | Kwon ................... G06F 17/211 704/2 |

* cited by examiner

*Primary Examiner* — Taelor Kim
(74) *Attorney, Agent, or Firm* — Marc Lowy

(57) ABSTRACT

The present invention is a method and system for automating repetitive user actions during the text editing operations of various computer files. Computer users may commonly perform some repetitive or patterned actions while editing text files such as scripts, or editing markup files like HTML or XML, or editing source code or even regular text files that contain tabular data or lists. The method and system of the present invention determines a pattern transformation, then applies it to any part of the text that matches a "Pattern". The method thus develops an algorithm that makes the transformation from "Pattern 1" to "Pattern 2", and formalizes it, by developing a finite-state machine. The pattern transformation is applied to any part of the text that matches "Pattern 1", and after this transformation has been applied, then the new text will match the user's intentions.

16 Claims, 39 Drawing Sheets

METHOD AND SYSTEM FOR AUTOMATING THE EDITING OF COMPUTER FILES

CROSS-REFERENCE TO RELATED APPLICATIONS

This application claims the benefit of U.S. provisional application No. 61/709,739, filed Oct. 4, 2012, which is incorporated by reference as if fully set forth.

STATEMENT REGARDING FEDERALLY SPONSORED RESEARCH AND DEVELOPMENT (Not Applicable.)

FIELD OF THE INVENTION

This invention relates to methods and systems for editing structured text in computer text files, and in particular to a method and system for automating computer text file editing.

DISCUSSION OF RELATED ART

The present invention is a method and system for automating repetitive user actions during the text editing operations of various computer files containing structured text. In many situations, computer users may commonly perform some repetitive or patterned actions while editing text files such as scripts, or editing markup files like HTML or XML, or editing source code written in any computer language, or editing even regular text files that contain tabular data or lists.

Clearly, there is a need for a system to automate editing of computer text files. Further, the needed system would build an algorithm to transform text from one pattern to another pattern, thus allowing a user to automate the editing of computer text files. The present invention accomplishes these objectives.

SUMMARY OF THE INVENTION

The present invention is a method and system for automating repetitive user actions during the editing operations of structured text in various computer files. In many situations, computer users may commonly perform some repetitive or patterned actions while editing text files such as scripts, or editing markup files like HTML or XML, or editing source code written in any computer language, or editing even regular text files that contain tabular data or lists. These repetitive editing actions might involve copy-paste operations from one file to another or within the same file, or adding/deleting text which is somehow identical, or modifying text by applying specific simple logic.

Assume that some text in an initial state matches with pattern "Pattern 1" and the pattern counter for this pattern is some value "X". A user starts modifying the text and the text changes to another state. Assume that at some state a new pattern "Pattern 2" appears and the pattern counter value is "2". If the pattern counter value for the rest of the text becomes (X-2) and still matches with "Pattern 1", then we can consider this to be a "pattern transformation." The user's logic has thus been understood.

This process can be described as: When a pattern transformation is determined, then the pattern transformation is applied to any part of the text that matches "Pattern 1", and after this transformation has been applied, then the new text will match the user's intentions. This embodiment of the present invention thus develops an algorithm that makes the transformation from "Pattern 1" to "Pattern 2", and formalizes it, by developing a finite-state machine. Thus this embodiment of the present invention modifies the text based on the pattern transformations.

Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

The present invention 10 is a method and system for automating repetitive user actions during the editing operations of structured text in various computer files. Computer users may commonly perform some repetitive or patterned actions while editing text files such as scripts, or editing markup files like HTML or XML, or editing source code written in any computer language, or editing even regular text files that contain tabular data or lists. These repetitive actions might involve copy-paste operations from one file to another or within the same file, or adding/deleting text which is somehow identical, or modifying text by applying specific simple logic.

In some embodiments of the invention 10, the method and system may operate on computers using the Microsoft Windows platform. Other embodiments of the invention 10 may operate on any other operating system or platform as well.

Figure 1:
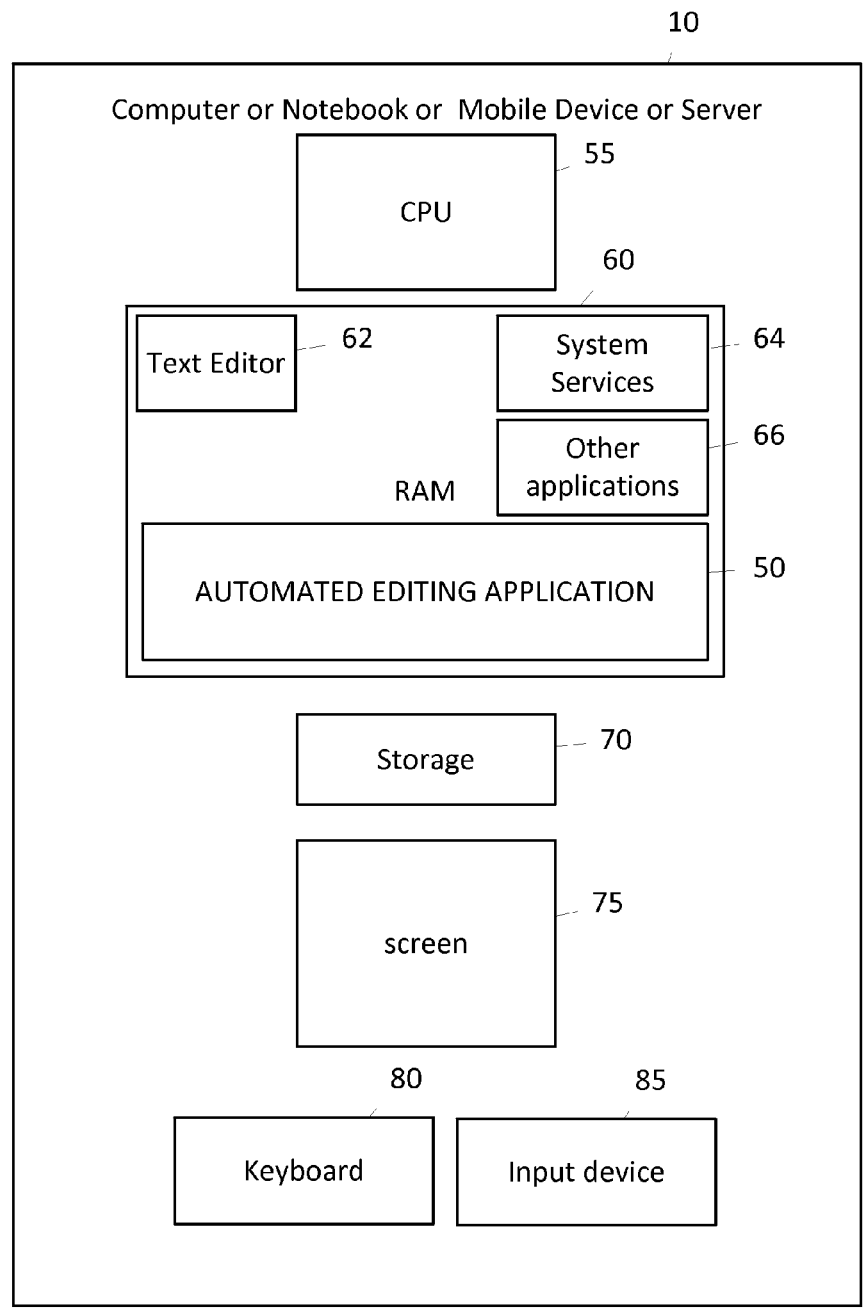
FIG. 1 is a system block diagram in accordance with a preferred embodiment of the present invention.

Referring to FIG. 1, the method and system of the invention 10 may be implemented in different embodiments on various computer systems/CPUs 55, including operation on a mobile computer, a desktop computer, a mobile device, or else a server. The computer screen 75 can display "visual" representations such as Notepad, Wordpad, MS Word, Internet Explorer and the like.

A computer user launches applications and can edit text in any application that supports text editing 62 capabilities, such as MS Word, Notepad and the like. Any text input field, form, or document 40 can be part of any "visual" applications. The computer system/CPU 55 may also include a keyboard 80, an input device 85, storage 70, system services 64, and other applications 66.

The Automated Editing Application 50 can be implemented in four or more embodiments to interact with the user and any other visual applications running on the computer:

1. Windows Standalone application: The user opens the Automated Editing Application 50 and starts editing any text. The Automated Editing Application 50 will provide all required services within the Automated Editing Application 50.

2. Automated Editing Application Add-on (extension): Works with any existing application such as Wordpad, Notepad, MS SQL Management Studio, Visual Studio and the like. The user can edit text and the Automated Editing Application Add-on will work on top of this and try to identify "repetitive" actions.

3. Automated Editing Application Service: No visual interface is available, but the application interacts with all "visual" applications, such as Notepad, Wordpad, MS Word. All text from all applications currently opened by the user are analyzed.

4. Automated Editing Application Integrated with an Operating System: If the user modifies some files or directories or performs operations that indicate some patterns in text modifications, then the invention 10 functions as a system process that monitors any kind of text changes on any entity within the operating system, and identifies patterns and provides suggestion to the user.

The following discussion is an example of an embodiment of the invention 10. The two terms "somehow identical" and "specific simple logic" will be explained and discussed further on.

A source text file contains this content:

1. Peter
2. Jon
3. Jim
4. Daniel
5. Mark
6. Tom
7. Anthony
8. Fred
9. Victor
10. Bob The source text file contains lines comprised of a number, a symbol ".", symbol "space", a "word" and then a symbol "Enter", followed by the next line containing the same format. The symbol "Enter" is actually represented by two characters but for demonstration purposes we can consider it as one character.

Assume that the user needs to slightly modify the text in this source file. The user needs to:
1. Delete the symbol "." contained in every line.
2. Add a symbol ";" at the end of every line right after some "name" like Peter or Jon.

We are assuming that the user modifies the text by making changes in one line and when all required changes in one line are completed, the user advances to another line. For this example we will assume this to be the case.

The table below displays the text and table states, while the user is changing the text.

| Original text (State 0) | Text after first set of changes Snapshot 1 | Text after second set of changes: Snapshot 2 |
| --- | --- | --- |
| 1. Peter | 1 Peter; | 1 Peter; |
| 2. Jon | 2. Jon | 2 Jon; |
| 3. Jim | 3. Jim | 3. Jim |
| 4. Daniel | 4. Daniel | 4. Daniel |
| 5. Mark | 5. Mark | 5. Mark |
| 6. Tom | 6. Tom | 6. Tom |
| 7. Anthony | 7. Anthony | 7. Anthony |
| 8. Fred | 8. Fred | 8. Fred |
| 9. Victor | 9. Victor | 9. Victor |
| 10. Bob | 10. Bob | 10. Bob |

The text will finally appear as follows:

```
1 Peter;
2 Jon;
3 Jim;
4 Daniel;
5 Mark;
6 Tom;
7 Anthony;
8 Fred;
9 Victor;
10 Bob;
```

Reviewing the source text again, the first line of the text is as follows:
"1. Peter"

This expression contains a number, a symbol ".", then a symbol "space", a word or more precisely a person's name, and the symbol "Enter". The description of this expression is referred to as the "text format".

A "text format" may be defined using simple rules. The process of defining a "text format" is very similar to "lexical analysis", IE the process of converting a sequence of characters into a sequence of tokens, including building tokens or lexemes in any compilation process for any computer language.

Any digit within a text or/and any combination of consecutive (consequent) digits can be considered to be a "NUMBER" token.

For example: 2 is NUMBER, 10 is also NUMBER, 13788 is NUMBER

Any letter from the subset of English alphabet letters and/ or any combination of consecutive letters is considered to be a "WORD" token. The letter case is not considered, so that the word can contain upper case or lower case letters or any of their combinations.

For example: Jim is a WORD, file is a WORD, SELECT is a WORD, silver is a WORD;

Any one (IE only one) visible character, other than an English alphabetic character or digit, is considered to be a token CHR_x, where x—considered is a character.

For example:
.is mapped to CHR_., !—CHR_!, ?—CHR_? and the like.
Note that any consecutive combination doesn't make up a token, so for one character there is only one token CHR_x and expression like "?!" which will be translated to "CHR_?"+ "CHR_!"

There are also invisible characters or white space characters: Space, Tab and Enter. In some sense they are exactly like (3), but they are just invisible.

The corresponding tokens for them are: CHR_SPACE, CHR_TAB and CHR_ENTER;

After defining this set of rules we can define a "text format" or "translate to text format" for our source code. Starting with the first line of the source file:

| 1 | Number |
| --- | --- |
| . | CHR_. |
| " " | CHR_SPACE |
| Peter | WORD |
| "Enter" | CHR_ENTER |

The first sentence "1. Peter" will be translated into "NUMBER+CHR_.+CHR_SPACE+WORD+CHR_ENTER". The character "+" is used to make this form more presentable and doesn't have any lexical/grammatical value. Here is a table that translates a source text into "text format":

| Source text | Text format |
| --- | --- |
| 1. Peter | NUMBER + CHR_. + CHR_SPACE + WORD + CHR_ENTER |
| 2. Jon | NUMBER + CHR_. + CHR_SPACE + WORD + CHR_ENTER |
| 3. Jim | NUMBER + CHR_. + CHR_SPACE + WORD + CHR_ENTER |
| 4. Daniel | NUMBER + CHR_. + CHR_SPACE + WORD + CHR_ENTER |
| 5. Mark | NUMBER + CHR_. + CHR_SPACE + WORD + CHR_ENTER |
| 6. Tom | NUMBER + CHR_. + CHR_SPACE + WORD + CHR_ENTER |
| 7. Anthony | NUMBER + CHR_. + CHR_SPACE + WORD + CHR_ENTER |
| 8. Fred | NUMBER + CHR_. + CHR_SPACE + WORD + CHR_ENTER |
| 9. Victor | NUMBER + CHR_. + CHR_SPACE + WORD + CHR_ENTER |
| 10. Bob | NUMBER + CHR_. + CHR_SPACE + WORD + CHR_ENTER |

It is obvious that all lines have the same text format.
And this format is: "NUMBER+CHR_.+CHR_SPACE+ WORD+CHR_ENTER"

So, we can consider this expression as a pattern. Any part of the text that has a "text format" equal to this pattern, is considered as "pattern match". This particular text consists of the lines that match this pattern:
"NUMBER+CHR_.+CHR_SPACE+WORD+ CHR_ENTER"

The "Pattern" definition is still intuitive. To strictly define the pattern definition, we need to build a rule. The rule is as follows: to find the pattern within any text, the first step is to transform the whole text into "text format" and then find at least two parts of the text format equal to each other. If such parts exist then we can state that the original text contains patterns. The pattern is the "text format" that is repeated in the text at least two times.

Our original text contains 10 lines. All of them are "pattern match" and all of them match to this pattern:

"NUMBER+CHR_.+CHR_SPACE+WORD+CHR_ENTER"

After any text modifications or editing operations, the text changes state. The original text is assumed to be in "state 0", IE the initial state. If the user deletes the character "." after the name "Peter", then the text is considered to have changed, and we can assume that the text is then in "state 1".

Looking at the table below, we can build a state sequence this way:

"State 0"=original text, "state 1" corresponds to snapshot 1, and "state 2" corresponds to snapshot 2.

| Text after first set of changes Snapshot 1 | Text after second set of changes: Snapshot 2 |
|---|---|
| 1 Peter; | 1 Peter; |
| 2. Jon | 2 Jon; |
| 3. Jim | 3. Jim |
| 4. Daniel | 4. Daniel |
| 5. Mark | 5. Mark |
| 6. Tom | 6. Tom |
| 7. Anthony | 7. Anthony |
| 8. Fred | 8. Fred |
| 9. Victor | 9. Victor |
| 10. Bob | 10. Bob |

Note:
Snapshot 1 is created when the user deleted the "." after the "1" and added the ";" after the word "Peter".

All three states will now be reviewed. "State 0", the original text, is comprised of ten text lines that match the pattern: "NUMBER+CHR_.+CHR_SPACE+WORD+CHR_ENTER".

The text format for State 1 is as we discussed earlier.

| Text after first set of changes Snapshot 1 | Text after second set of changes: Snapshot 2 |
|---|---|
| 1 Peter; | NUMBER + CHR_SPACE + WORD + CHR_; + CHR_ENTER |
| 2. Jon | NUMBER + CHR_. + CHR_SPACE + WORD + CHR_ENTER |
| 3. Jim | NUMBER + CHR_. + CHR_SPACE + WORD + CHR_ENTER |
| 4. Daniel | NUMBER + CHR_. + CHR_SPACE + WORD + CHR_ENTER |
| 5. Mark | NUMBER + CHR_. + CHR_SPACE + WORD + CHR_ENTER |
| 6. Tom | NUMBER + CHR_. + CHR_SPACE + WORD + CHR_ENTER |
| 7. Anthony | NUMBER + CHR_. + CHR_SPACE + WORD + CHR_ENTER |
| 8. Fred | NUMBER + CHR_. + CHR_SPACE + WORD + CHR_ENTER |
| 9. Victor | NUMBER + CHR_. + CHR_SPACE + WORD + CHR_ENTER |
| 10. Bob | NUMBER + CHR_. + CHR_SPACE + WORD + CHR_ENTER |

The text format for State 2 is as follows:

| Text after first set of changes Snapshot 1 | Text after second set of changes: Snapshot 2 |
|---|---|
| 1 Peter; | NUMBER + CHR_SPACE + WORD + CHR_; + CHR_ENTER |
| 2 Jon; | NUMBER + CHR_SPACE + WORD + CHR_; + CHR_ENTER |
| 3. Jim | NUMBER + CHR_. + CHR_SPACE + WORD + CHR_ENTER |
| 4. Daniel | NUMBER + CHR_. + CHR_SPACE + WORD + CHR_ENTER |
| 5. Mark | NUMBER + CHR_. + CHR_SPACE + WORD + CHR_ENTER |
| 6. Tom | NUMBER + CHR_. + CHR_SPACE + WORD + CHR_ENTER |
| 7. Anthony | NUMBER + CHR_. + CHR_SPACE + WORD + CHR_ENTER |
| 8. Fred | NUMBER + CHR_. + CHR_SPACE + WORD + CHR_ENTER |
| 9. Victor | NUMBER + CHR_. + CHR_SPACE + WORD + CHR_ENTER |
| 10. Bob | NUMBER + CHR_. + CHR_SPACE + WORD + CHR_ENTER |

A simple analysis of all three states is as follows:

From "state 0" to "state 1" there were 2 changes in the text: "." was deleted, and ";" was added at the end of the text line.

After this change, the text format of the first line is: "NUMBER+CHR_SPACE+WORD+CHR_;+CHR_ENTER".

The remainder of the text format is the same as it was before and it matches the previous text format: "NUMBER+CHR_.+CHR_SPACE+WORD+CHR_ENTER", which can still be considered as a pattern.

But if we look at "state 2", then we can see that first line and the second line have the same format: "NUMBER+CHR_SPACE+WORD+CHR_;+CHR_ENTER".

But if two lines have the same format, that means there is a new Pattern:

The first and second line matches this pattern: "NUMBER+CHR_SPACE+WORD+CHR_;+CHR_ENTER"

The rest of the text matches this pattern: "NUMBER+CHR_.+CHR_SPACE+WORD+CHR_ENTER"

A new definition will now be introduced: "pattern counter".

A pattern counter is an amount (numeric value) that corresponds to the amount of text parts that matches a particular pattern:

For "state 2" there are 2 patterns and their pattern counters are:

Pattern: "NUMBER+CHR_SPACE+WORD+CHR_;+CHR_ENTER", pattern counter equals 2.

Pattern: "NUMBER+CHR_.+CHR_SPACE+WORD+CHR_ENTER" has pattern counter 8.

| Text after first set of changes Snapshot 1 | Text after second set of changes: Snapshot 2 | Pattern counter |
|---|---|---|
| 1 Peter; | NUMBER + CHR_SPACE + WORD + CHR_; + CHR_ENTER | 2 |
| 2 Jon; | NUMBER + CHR_SPACE + WORD + CHR_; + CHR_ENTER | |

-continued

| Text after first set of changes Snapshot 1 | Text after second set of changes: Snapshot 2 | Pattern counter |
|---|---|---|
| 3. Jim | NUMBER + CHR_. + CHR_SPACE + WORD + CHR_ENTER | 8 |
| 4. Daniel | NUMBER + CHR_. + CHR_SPACE + WORD + CHR_ENTER | |
| 5. Mark | NUMBER + CHR_. + CHR_SPACE + WORD + CHR_ENTER | |
| 6. Tom | NUMBER + CHR_. + CHR_SPACE + WORD + CHR_ENTER | |
| 7. Anthony | NUMBER + CHR_. + CHR_SPACE + WORD + CHR_ENTER | |
| 8. Fred | NUMBER + CHR_. + CHR_SPACE + WORD + CHR_ENTER | |
| 9. Victor | NUMBER + CHR_. + CHR_SPACE + WORD + CHR_ENTER | |
| 10. Bob | NUMBER + CHR_. + CHR_SPACE + WORD + CHR_ENTER | |

It is obvious that the user seeks to "transform" text from the format
"NUMBER+CHR_.+CHR_SPACE+WORD+CHR_ENTER"
into a new format:
"NUMBER+CHR_SPACE+WORD+CHR_;+CHR_ENTER"

Example one will be defined as follows. Assume that some text in an initial state matches with pattern "Pattern 1" and the pattern counter for this pattern is some value "X". A user starts modifying the text and the text changes to another state. Assume that at some state a new pattern "Pattern 2" appears and the pattern counter value is "2". If the pattern counter value for the rest of the text becomes (X-2) and still matches with "Pattern 1", then we can consider this to be a "pattern transformation."

Essentially, this means that we "understood" the user's logic and we know what needs to be changed and how. We can also describe this process as: When a pattern transformation is determined, then we need to apply the pattern transformation for any part of the text that matches "Pattern 1", and after this transformation has been applied, then the new text will match the user's intentions. We thus need to build an algorithm that makes the transformation from "Pattern 1" to "Pattern 2" and this can be formalized. By referencing computer theory this means that an algorithm can be developed, IE a finite-state machine.

This is only applicable if the user wants to apply his/her logic to the whole text or some part of it, because it is possible that the user may have wanted to change only the first two lines in the text and leave the rest of the text unchanged.

The assumption that the user wants to apply the pattern transformation is very important. The case here is that the user want to modify the text based on the pattern transformations.

We will now review the the concepts of "somehow identical" and "specific simple logic", mentioned at the beginning of this discussion. "Somehow identical" can be viewed from the "text format" point of view. Instead of looking at text and capturing states of text changes, we need to examine "text format", study the changes, and make an analysis in text format. The expression "somehow identical" can be changed to lines/or text regions that have identical text format. The expression "simple logic" should make more sense now: simple logic can actually refer to the pattern transformation of the text format. This expression can be applied for any text editing operations: adding text, modifying text, removing text, or any possible combination of these actions. The user moves the cursor from one line to another and makes changes in one line or text region and then moves the cursor to another line and attempts to make exactly the same changes in a new line or text region.

Its important to consider that there can be situations when a user changes some text and the logic of his/her changes are not addressed by pattern transformations. In such a case, we consider those changes to be out of the scope of this document.

The example embodiment previously discussed with simple text is an ideal text for analyzing pattern transformations. Nevertheless, other realistic example embodiments may contain more complicated text and may contain much "unclear" pattern text regions, but this algorithm will still work for them as well. However, before performing an analysis, we will need to divide the whole text into regions and then analyze each specific region. We can also introduce "complex lexemes or tokens" and use regular expressions to "collapse" some parts of the text and then analyze pattern transformations. We can also use grammar to "collapse" some expressions.

It's a good time now to review the original source text one more time and ask this question: when or what type of text can be a good source material or input for the pattern transformations? The answer is very simple: any source code written in computer language, any scripts in any language, any markup files, and any configuration files are the best "input" or best material to apply this algorithm and predict user intentions or logic. Another example of good source material files are regular tabular data or lists. And the reason for this is very simple: any source code text, scripts, configuration files usually contain the identical "format text" parts in them.

We will define an example embodiment two as follows: If at any state a new pattern "Pattern 2" appears and it's pattern counter value is equal to two, and no other patterns counter are changed, then the user wants to add some patterned text that matches to pattern "Pattern 2". Again, it is very similar to example one above, but the logic here is this: the user wants to add some patterned text and this process differs from modifying text or deleting some parts of the text.

The major similarity between example embodiment one and example embodiment two is that if a new pattern appears and it's pattern counter is equal to "2", then the user does some repetitive action and the logic of his/her action can be interpreted or formalized and we can build an algorithm to "complete" user actions.

Figure 2:
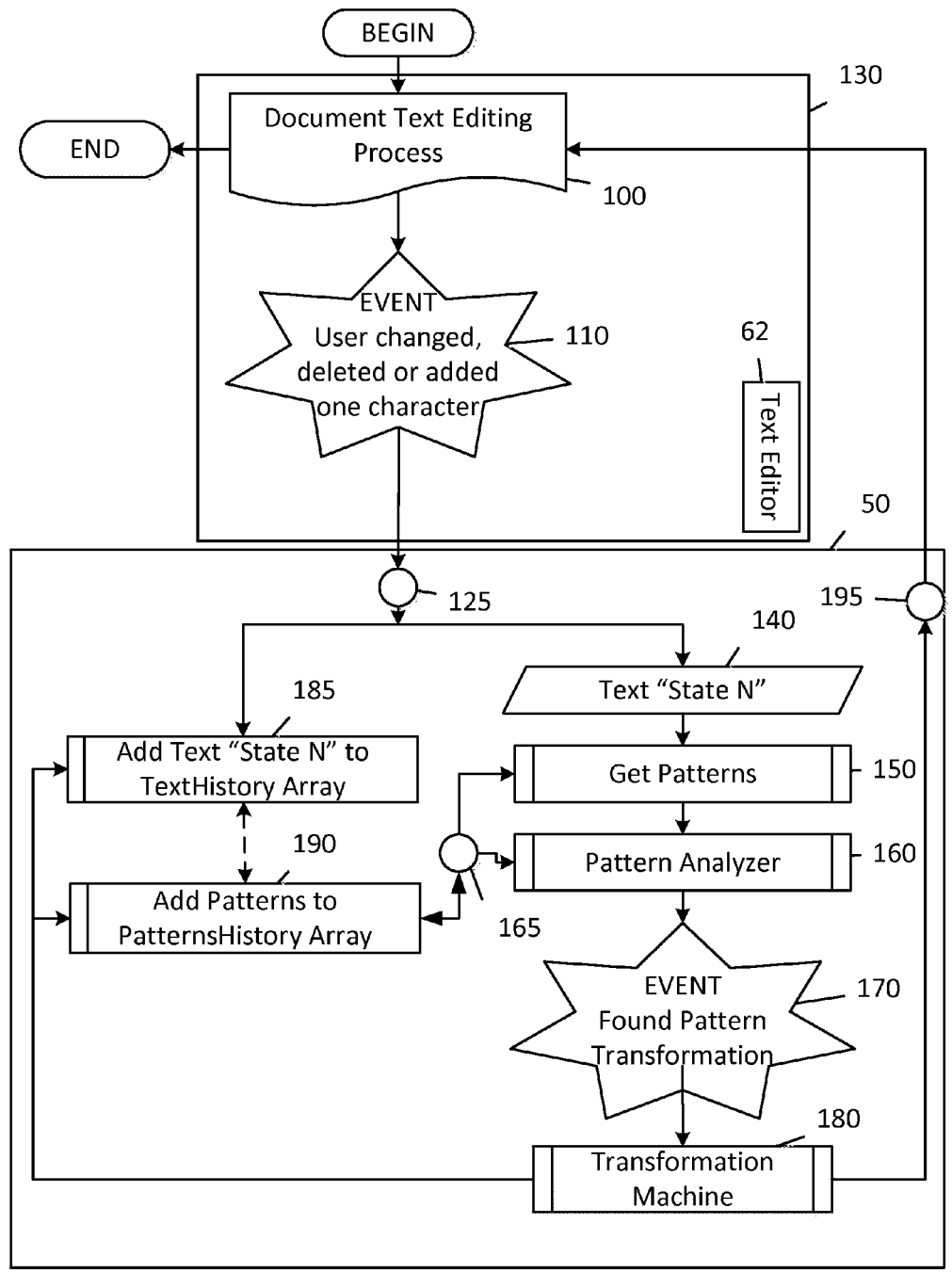
FIG. 2 is a flowchart of the Main Process in accordance with a preferred embodiment of the present invention.

Referring now to FIG. 2, a flow chart of the main processes are illustrated, in accordance with a preferred embodiment of the present invention 10. Step 100 represents any document opened in the text editor 62 process, for example a page in a text editor such as Wordpad, a window in Visual Studio.NET, or MS Word document and the like. At step 110 an event has occurred where a user makes one minor change in a document, such as deleting or updating or adding one and only one visible character of any type. As soon as the computer user releases the button this event will occur. Usually in programming terminology this is referred to as a "Text_Changed" event.

At step 125 is shown a data send pipe-line. This means that when the text is changed by the user a string of current Text, ie Text snapshot "State N" 120 is sent to external processes Automated Editing Application 50 process and to TextHistory Array storage 185 which store all states of modified text for future reference.

The Automated Editing Application 50 comprises all processing steps outside of the data interface 130. The Text Editor application 62 might be, among other applications, the Windows WordPad editor, or Visual Studio.NET, or Microsoft Word and the like. In different platforms and different embodiments of the invention 10, there is a data interface 130 between the Automated Editing Application 50 and the user's text editor 62 and document 100. The data interface 130 separates any Text Editor application 62 and its internal data flow from the Automated Editing Application 50 that implements the software processes of the invention 10. The Automated Editing Application 50 can be designed as an add-on for Microsoft Word or an add-on for Visual Studio or other applications.

An array of strings, "TextHistory Array" 185, store all snapshots received from the Text Editor 120 via data pipeline 125. A snapshot of the modified text "State N" 140 is generated in the Text Editor 120. The process Get Patterns 150 identifies patterns in a text "State N" 140. The Pattern Analyzer 160 process analyzes all history patterns and identifies the moment when a Pattern Transformation Event 170 occurs. When the Pattern Analyzer 160 finds a transformation, it identifies the "Pattern Source" and the "Pattern Destination" and it passes these two parameters to the Transformation Machine 180.

A found Pattern Transformation Event 170 will occur when there is a Pattern Transformation. The Transformation Machine 180 accepts three parameters: 1. the current last snapshot text "State N" 140; 2. the Pattern source (PatternSource described in FIG. 11A, step 1000); and 3. the Pattern Destination (PatternDestination described in step FIG. 11A, step 1000). The Transformation Machine 180 then builds a script that "transfers" the source text to destination text, and then finds all "text regions" that match the pattern source, and applies this script to the destination text that matches the Pattern Destination. In step 195, the text produced by the transformation machine 180 is interfaced to the Text Editor 62. When the "New State N" text is finally created this way it sends this new "transformed" text to the Text Editor 30 and replaces the current "State N" text 120 with the "New State N" text. When the Transformation Machine 180 finally changes the text it sends it back to the Text Editor 120. A pipeline 165 sends or exchange patterns collected in "Get Patterns" 150 with the PatternsHistory Array 190. The PatternsHistory Array 190 feeds the "Pattern Analyzer" 160 with patterns.

The Automated Editing Application 50 is implemented in the various algorithms and functions illustrated in FIGS. 3A-18C. In FIG. 2, the process GetPatterns 150 identifies if a pattern exists within a structured computer text, and is substantially implemented in FIGS. 3A-4B. The process Pattern Analyzer 160 determines a pattern transformation and is substantially implemented in FIGS. 5A-11B. The Transformation Machine 180 that builds an algorithm for performing a pattern transformation is substantially implemented in FIGS. 13A-14C. The process of applying the pattern transformation to a part of the text that matches a pattern (FIG. 2, no. 195) is substantially implemented in FIG. 12 and FIGS. 15-18C.

Figure 3A:
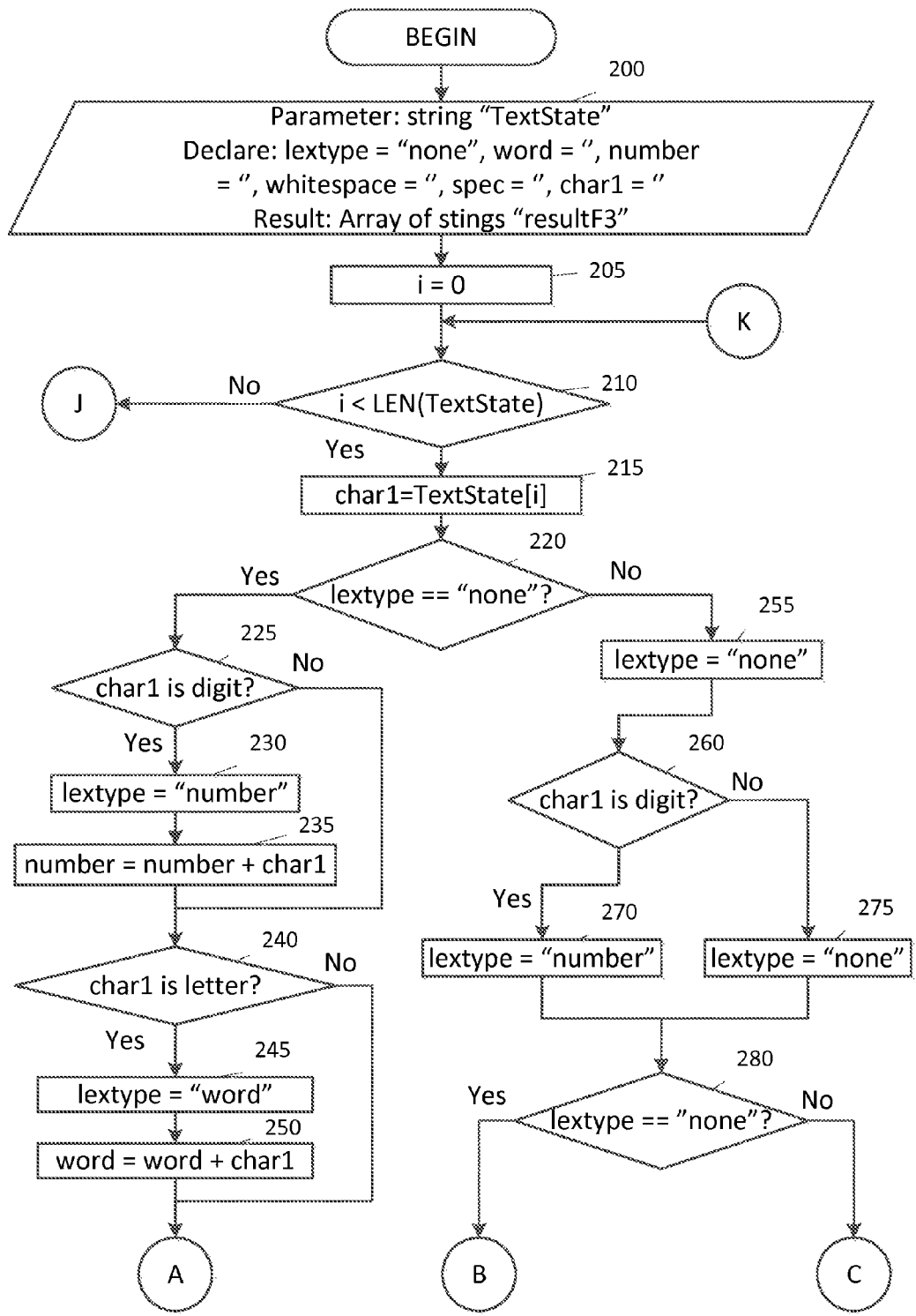
FIG. 3A is a flowchart of a PreBuildTextFormat Process in accordance with a preferred embodiment of the present invention.

Referring now to FIG. 3A, a flowchart of a PreBuildTextFormat Process is illustrated, in accordance with a preferred embodiment of the present invention 10. The PreBuildTextFormat process is designed to convert (transform) any regular text to a format of "WORD", "NUMBER", "WHITESPACE" or "SPECIAL_Chars". At step 200 TextState is the original text snapshot that is captured after any event where text was edited in any application that has text editor capabilities, such as Microsoft Word, Visual Studio, WordPad and the like. Each time a user has edited text such as adding, updating, or deleting one character and thereby changing the text state, the TextState string is the source for it. Lextype refers to "lexeme type", which can be a word, number, a white space or a special character. The whole text TextState is a string which can be split into an array of characters. Each single character can be either a digit, a letter or white space. If a character is not one of these types, then it is considered to be a special character. The variables "word" and "number" store and keep track of numbers and words within the text. The process starts with dividing the text into an array of characters and then loops through each single character. The variables word and number can then store consecutive characters inside of the loop.

The variable "i" is a loop counter and is initialized to 0 at step 205. The variable "char1" is a temporary variable assigned to receive a character from the TextState string. The result is an array of strings "resultF3" which will contain a result such as {"1", ".", "Peter", " "}.

Step 210 performs a decision that controls the loop. When TextState is split into an array of characters, the char1 string is assigned the first characters and then processed inside of the loop. The "i" variable is then incremented at the bottom of the loop in step 460 (FIG. 3E). At step 215 char1 receives one character from TextStage, and based on the char1 type, the lextype and other variables provide the work flow to generate result "resultF3". Step 220 examines lextype in a decision step: if lextype equals "none", the result is that every consecutive character char1 defines the next lexeme type, and processing continues at step 225.

At step 220, if lextype is not equal to "none", then "lextype" is reset to "none" (step 255), and the value in char1 controls the flow (step 260). At step 260 lextype will contain the current char1 type or current lexeme type. Char1 is the current position or part of the current lexeme, and if char1 is a digit, then we can consider that there is either a continued lexeme or the lexeme has changed to a new type. This check will be done later. If char1 is a digit (step 270), then lextype is assigned "number" (step 270), otherwise lextype is assigned "none" (step 275). At step 280, the value of lextype is checked. If it has value "none", that means char1 is not a digit and the processing continues at connector B, otherwise processing continues at connector C.

At step 225, if char1 is a digit, then lextype is assigned "number" (step 230) and the value in char1 is added to the "number" variable (step 235). If char1 is a letter (step 240), then lextype is assigned "word" (step 245) and the value in char1 is added to the "word" variable (step 250). If char1 is not a letter (step 240), processing continues at connector A.

Figure 3B:
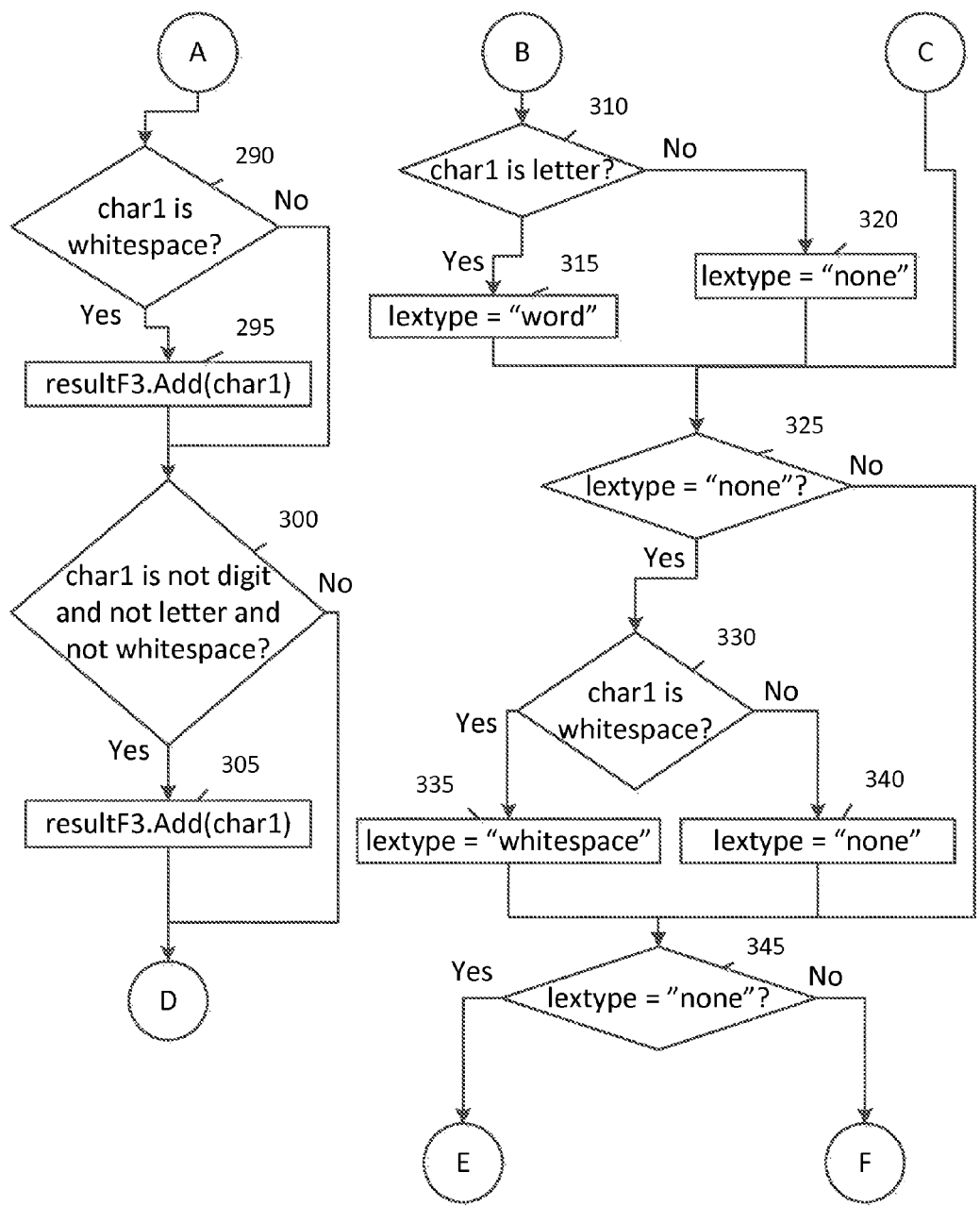
FIG. 3B is a flowchart of a PreBuildTextFormat Process in accordance with a preferred embodiment of the present invention.

Referring now to FIG. 3B, a flowchart of a PreBuildTextFormat Process is illustrated, in accordance with a preferred embodiment of the present invention 10. Processing continues from connectors A, B, and C. At step 400, the program checks whether char1 is white space. If char1 is white space, then we can add this value to the resultF3 array (step 295). This means that "lexeme" is defined, since "white space" can contain only one character. Next (step 300) the program checks if char1 is neither a digit, nor a letter, nor a white space. If so, then char1 is a special character like "?" or "," or any other special character. Since a special character can only be one character, we then add the character to array resultF3 (step 305). Processing continues through connector D.

Processing continues from Connector B in FIG. 3B. When the "lextype" is not equal to "none", and char1 has been checked for "is digit", the program now checks if char1 "is letter" (step 310). If so, then lextype is set to the "word" value (step 315). At step 325, lextype is checked for the "none" value. At step 325, if "lextype" is not equal to "none", processing continues at step 345. At step 325, if lextype is equal to "none", the program now checks if lextype is assigned a "number" or "word" value (step 330). If it's not, then the program checks if char1 is white space. If it is then the program sets lextype equal to "white space" at step 395. In step 345, the function checks if lextype is equal to none.

At step 345, if lextype is "none", processing continues at connector E. At step 345, if lextype is not equal to "none", processing continues at connector F.

Figure 3C:
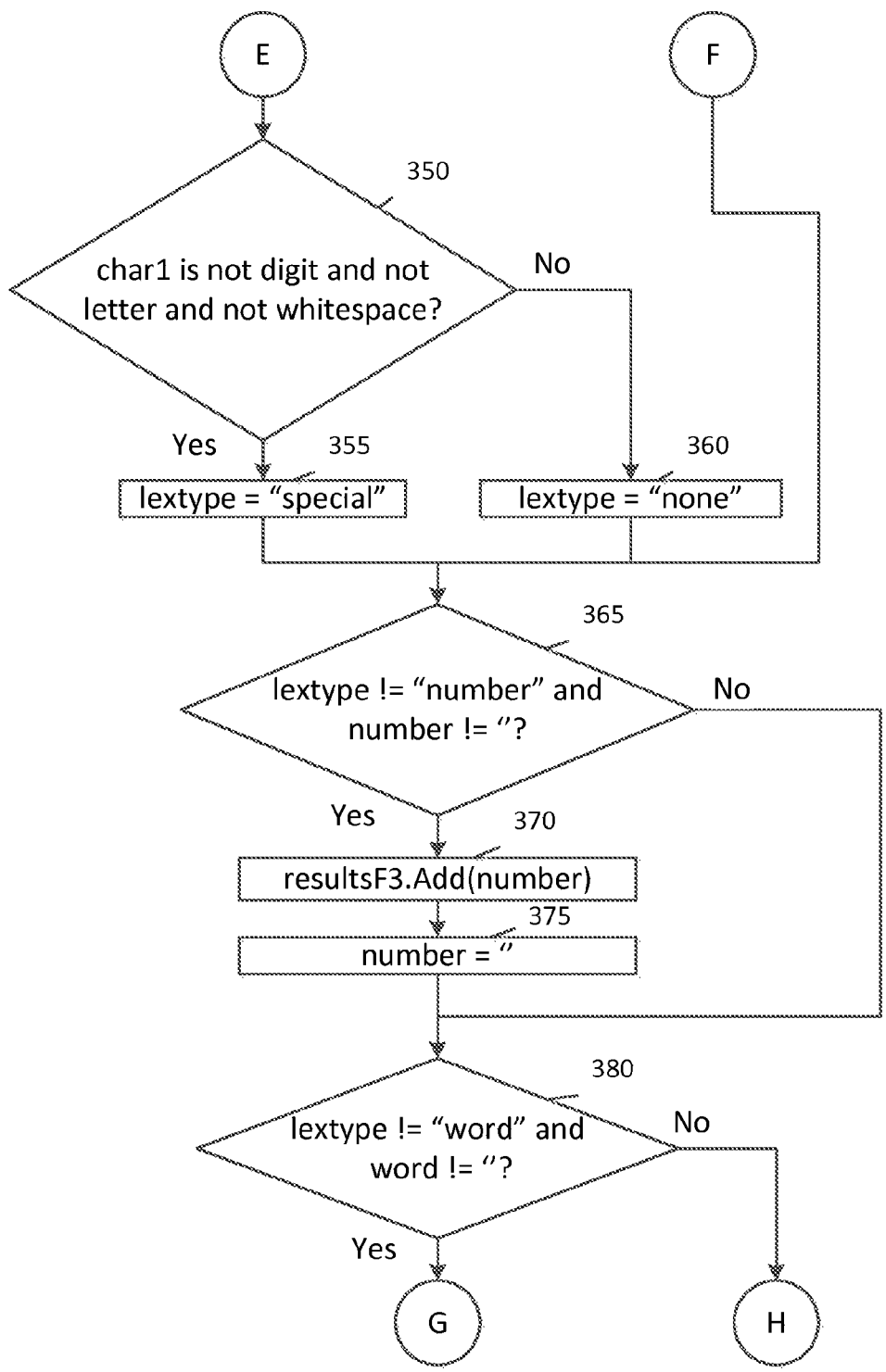
FIG. 3C is a flowchart of a PreBuildTextFormat Process in accordance with a preferred embodiment of the present invention.

In FIG. 3C, a flowchart of a PreBuildTextFormat Process is illustrated, in accordance with a preferred embodiment of the present invention 10. Processing now continues through connectors E and F. At step 350, the program checks if char1 is not one a digit, nor a letter, nor a white space. If so, the lextype is set to "special" (step 355), otherwise lextype is set to "none" (step 360).

After lextype is set in the previous steps, the program checks if lextype contains the type number, but the number is not equal to an empty string (step 365). If so, we need to "flash" this value into the resulting array resultF3 (step 370) and reset the number to value " " (step 375). This means that the current lexeme "number" has completed and the current position for char1 has moved to a new lexeme, other than a number. At step 380, after lextype was set in the previous steps, the program now checks if lextype contains the type word, but the word is not equal to an empty string. Processing continues at connectors G and H.

Figure 3D:
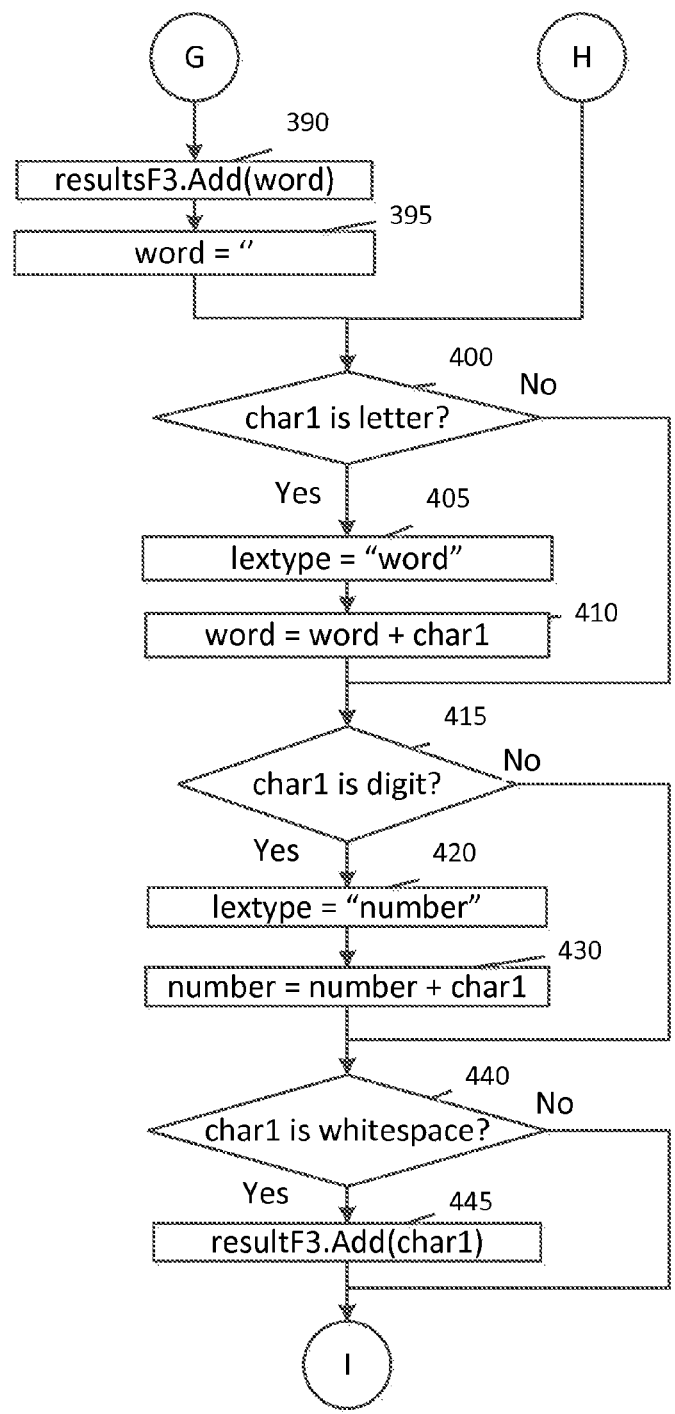
FIG. 3D is a flowchart of a PreBuildTextFormat Process in accordance with a preferred embodiment of the present invention.
Figure 3E:
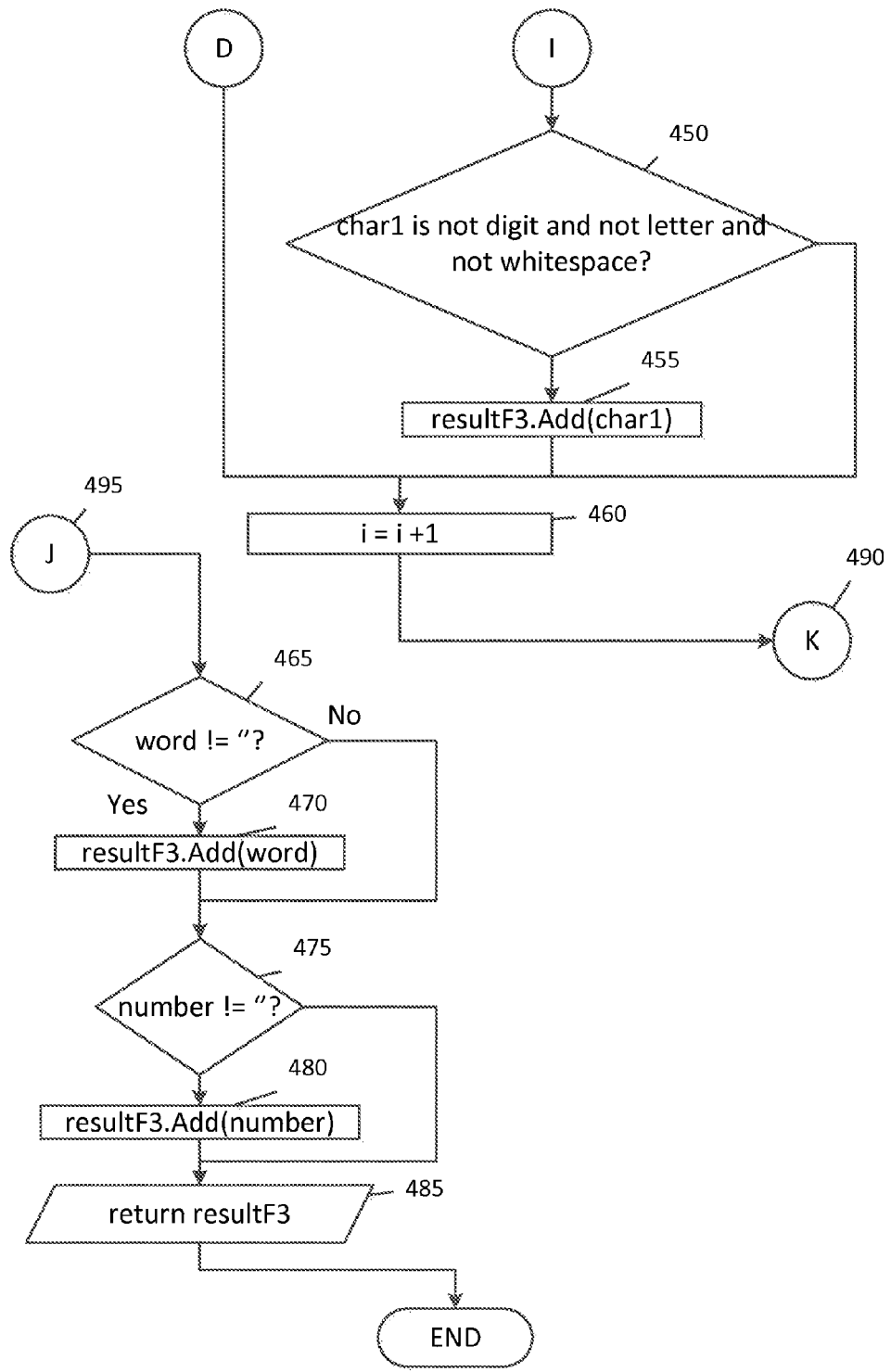
FIG. 3E is a flowchart of a PreBuildTextFormat Process in accordance with a preferred embodiment of the present invention.

FIG. 3D illustrates a flowchart of a PreBuildTextFormat Process, in accordance with a preferred embodiment of the present invention 10. Processing continues from connectors G and H. If lextype contains the type word, but the word is not equal to an empty string, processing continues to FIG. 3D. We need to "flash" this value into the resulting array resultF3 (step 390) and reset the number to value " " (step 395). This means that the current lexeme "number" has completed and the current position for char1 has moved to a new lexeme, other than a word.

The program now checks if char1 is a letter (step 400). If it is a letter, then we set lextype to value "word" (step 405) and add char1 value to variable word (step 410). At step 415, the program checks if char1 is a digit. If so, then we set lextype to value "number" (step 420) and add char1 value to variable number (step 430). At step 440, the program checks if char1 is white space. If so, then we add this value to the resulting array resultF3 (step 445). Processing continues through connector I.

Referring to FIG. 3E, a flowchart of a PreBuildTextFormat Process is illustrated, in accordance with a preferred embodiment of the present invention 10. Processing continues from connectors D and I. At step 450 the program checks if char1 is not a digit and not a letter and not white space. If so, then char1 is considered as a "special" character and it is added to resultF3 array (step 455). At step 460, the program increments the position of variable "i" to look at the next character within TextState and complete a round of the loop. Program flow then continues through connector K (step 490) and returns to FIG. 3A, where the process of performing all checks starts again.

Processing continues from connector J (step 495). We now need to validate if a word or a number still contains some values or not. In step 465, the variable word is checked if it contains text. If so, the function continues at step 470. Otherwise the function continues at step 475. In step 470 the array result resultF3 is added to the word variable.

At step 475 we check if number is not empty. If it is not empty then we put this value into resultF3 (step 480). The resulting array resultF3 (step 485) will contain all lexemes of the current text. Processing ends here.

Figure 4A:
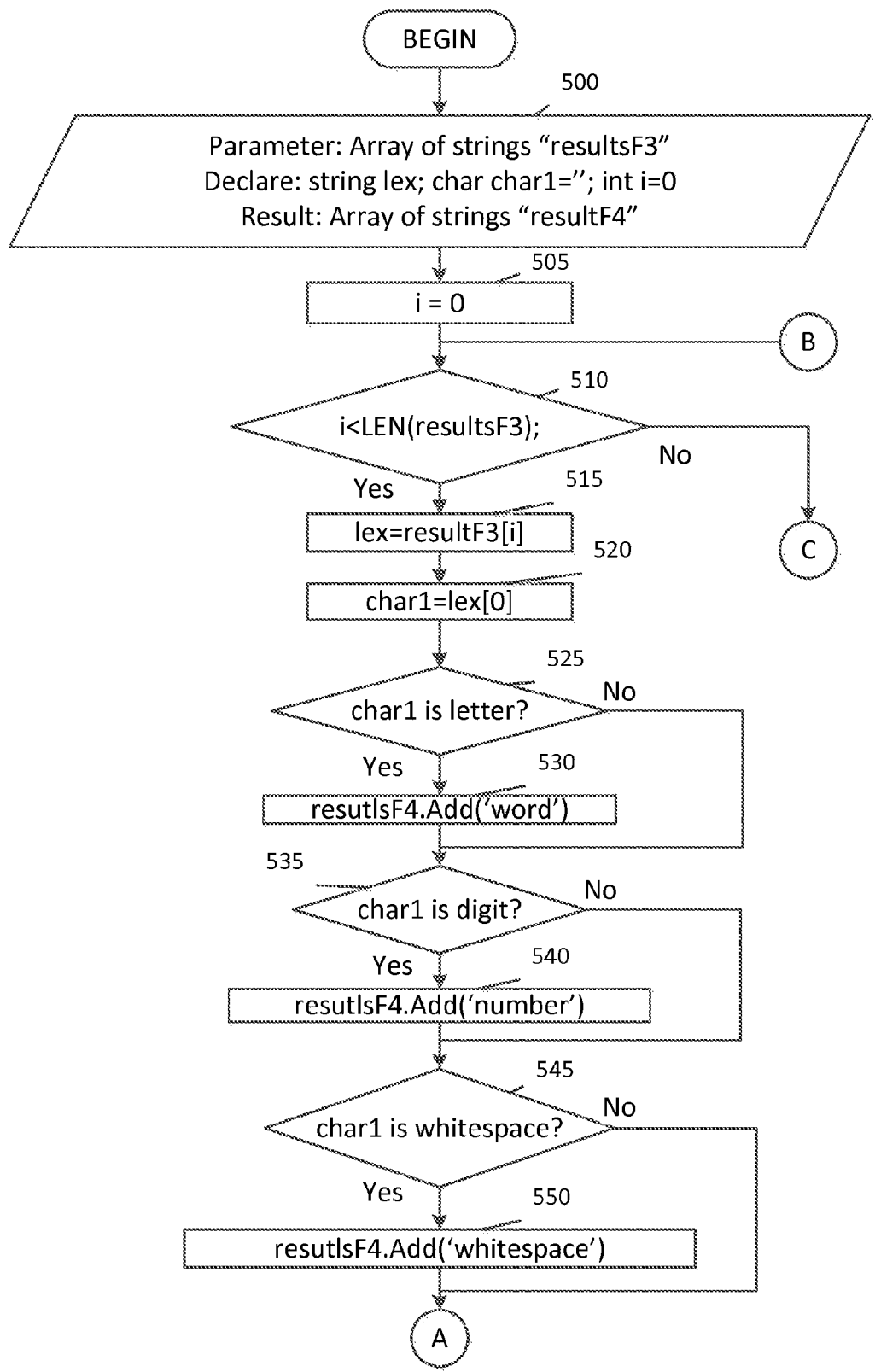
FIG. 4A is a flowchart of a BuildTextFormat Process in accordance with a preferred embodiment of the present invention.

Referring now to FIG. 4A, a flowchart for a BuildTextFormat function is shown. This function converts the array of lexemes to their correct types. The function is designed to accept an array of strings "resultF3".

For example, if resultF3 contains
{"123", "Peter", " ", ".", ";"}
the BuildTextFormat function will convert the array of strings "resultF3" into this array:
{"NUMBER", "WORD", "WHITESPACE", "CHAR_.", "CHAR_;"}

In step 500 the function takes one parameter, "resultF3", which is passed from the previous function "PrebuildTextFormat" (FIG. 3E, step 485). There are several local variables: string lex, char "char1", and int "i". The function returns an array of strings "resultF4" (step 550).

In step 505, the variable "i" is initialized with i=0. In step 510, the function checks if "i" is less than the length of "resultF3", if so then variable "i" is used to iterate through all elements in the array "resultF3". If "i" is greater than LEN (resultF3), then processing continues at Connector C at the end of the function. In step 515, the variable "lex" is set to resultF3[i], so that "lex" is set to the current array element in resultF3. In step 520, the variable "char1" is set to the first character of variable "lex": char1=lex[0]. This means that the current string "lex" needs to be split into chars, with char1 assigned the value of the first char in string. In step 525, the function checks if char1 is a letter. If char1 is a letter, then the function adds a new element "WORD" to the array of string resultF4 (step 530), otherwise the function continues at step 535. In step 535, the function checks if char1 is a digit. If char1 is a digit then the function adds a new element "NUMBER" to the array of strings resultF4 (step 540), otherwise the function continues at step 545. In step 545 the function checks if char1 is whitespace. If char1 is a whitespace then the function adds a new element "WHITESPACE" to the array of strings resultF4 (step 550), otherwise the function continues at connector A.

Figure 4B:
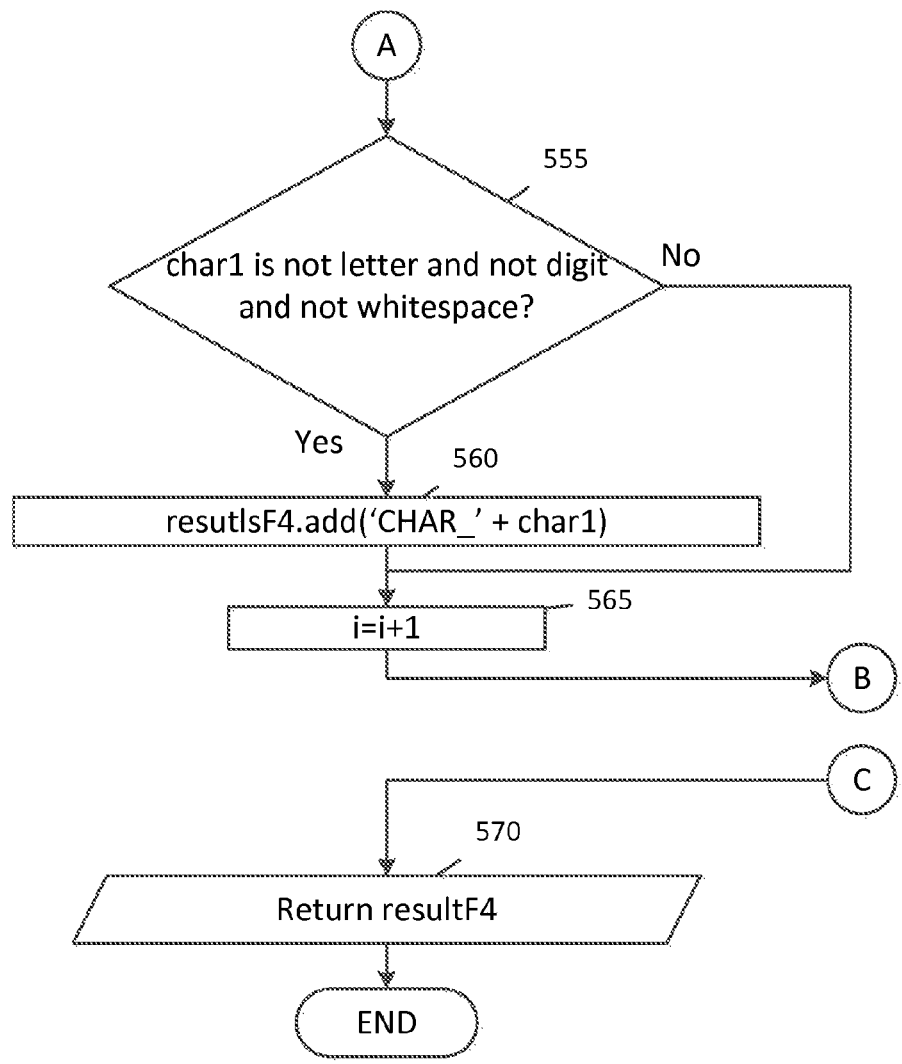
FIG. 4B is a flowchart of a BuildTextFormat Process in accordance with a preferred embodiment of the present invention.

Referring now to FIG. 4B, processing continues from Connector A. In step 555, the function checks if char1 is not a letter and not a digit and not a whitespace. If so, then in step 560 a new element "CHAR_"+char1 then is added to resultF4. In step 555, if the char1 is a letter, or a digit, or a whitespace, then the function continues at step 565. At step 565, the value of "i" is increased by "1", so that the loop jumps to the next element in resultF3 array, and processing continues at Connector B. In step 570, processing continues from Connector C, an array of strings "resultF4" is returned, and the function ends.

Figure 5A:
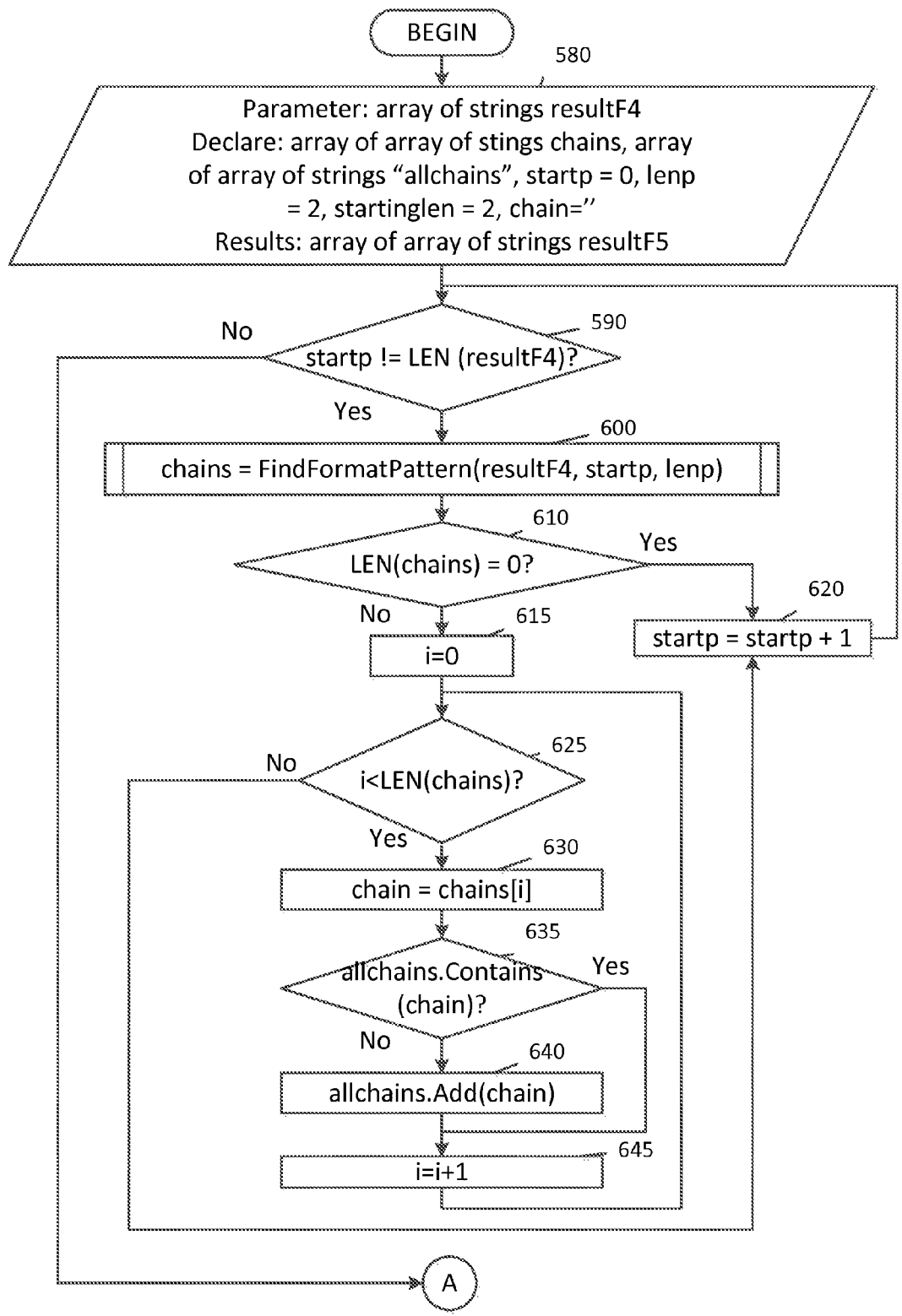
FIG. 5A is a flowchart of a Pattern Finder Process in accordance with a preferred embodiment of the present invention.

Referring now to FIG. 5A, a flowchart for a Pattern Finder function is shown. This function is designed to find a "pattern" within an array of "resultF4" which is made up of elements referred to as "lexeme types".

For example:
resultF4={"WORD", "NUMBER", "WHITESPACE", "WORD", "NUMBER", "WHITESPACE"}
The function "PatternFinder" will return an array of array of strings {"WORD", "NUMBER", "WHITESPACE"}, since this is pattern in original array "resultF4"

In step 580, the "PatternFinder" function accepts one parameter: an array of strings "resultF4". The "PatternFinder" function declares several variables: an array of strings "chains", an array of array of strings "allchains", an int startp=0, an int lenp=2, an int startinglen=2, and string chain=" ". The function returns an array of strings "resultF5". In step 590 the function checks if "startp" is not equal to the length of "resultF4". If startp is equal to Length of "resultF4", then processing continues at the end of the function through connection point "A". In step 600 a call to function FindFormatPattern is made and three parameters are passed: resultF4, startp and lenp variables. This function returns all possible patterns from starting point "startp" (or the start position within array resultF4"), where the format pattern length is a minimum value 2, since "lenp" is equal to "2". The return variable chains will contain an array of strings with patterns returned by the function call "FindFormatPattern".

In step 610, the function checks if the length of array "chains" is equal to "0". If it's equal to "0", then the startp position needs to be increased by "1" and loop execution is continued. In step 615, if the length of array "chains" is not equal to "0", then the function must loop through all elements in the array "chains". The first step then is to assign value "0" to variable "i". In step 620, since the length of array "chains" is equal to "0", then the value of "startp" is increased by 1. To continue the loop, control is passed to step 590 where the function checks if "startp !=LEN(resultF4")".

Continuing now in step 625, the function checks if variable "i" is less than the length of array "chains". If "i" exceeds the length of "chains" then processing continues at step 620 with "startp=startp+1" and the loop is continued. In step 630, the variable chain is set to the value chains[i], so that chain contains an array of strings, ie the "pattern" in resultF4 array. In step 635, the function checks if "allchains" contains an array such as "chain". The "Contains" function is predefined function that checks if one array contains another array. In step 640, if "allchains" doesn't contains array "chain", then the function adds element "chain" into array "allchains". In step 645, the value of variable "i" is increased by "1" and loop execution continues.

Figure 5B:
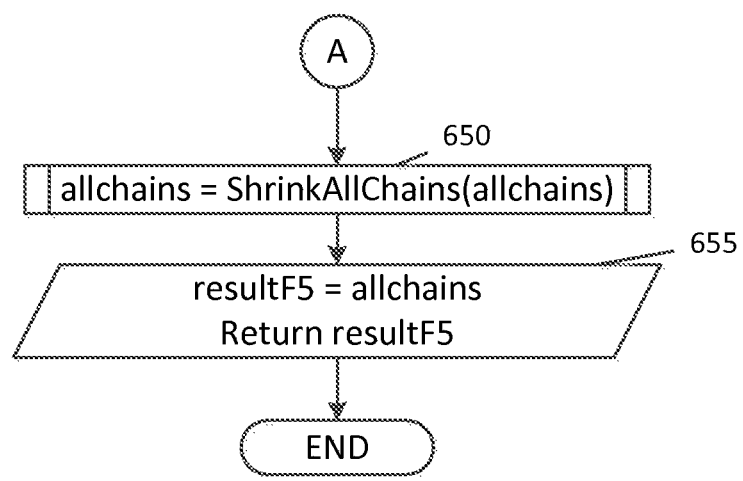
FIG. 5B is a flowchart of a Pattern Finder Process in accordance with a preferred embodiment of the present invention.

Referring now to FIG. 5B, processing continues from connector A. In step 650, function "ShrinkAllChains" is called and passed one parameter "allchains". This function will return a "clean" array of chains that are considered to be a pattern in the "resultF4" array.

In step 655, the resultF5 is set to "allchains" and this value is returned.

Figure 6:
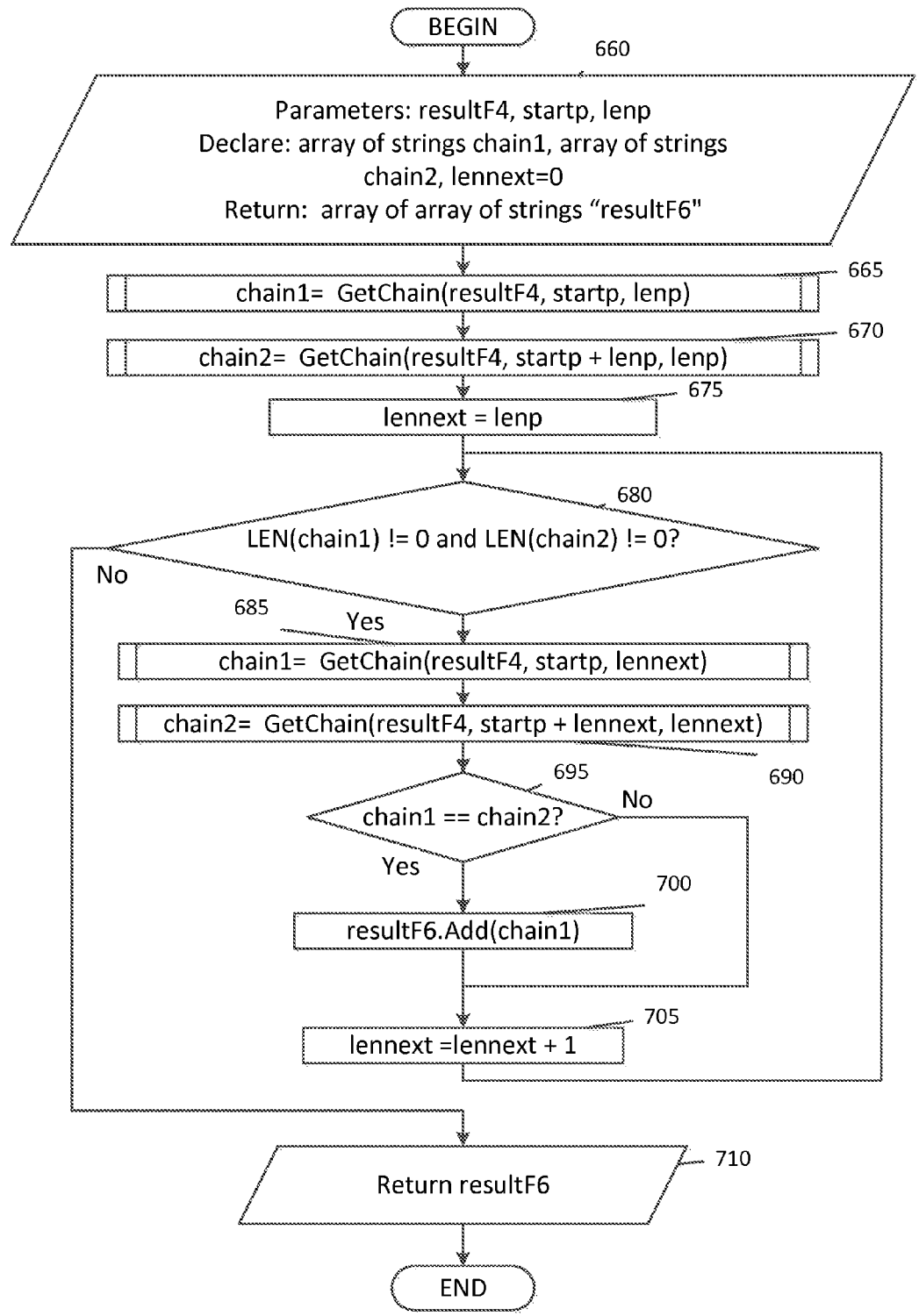
FIG. 6 is a flowchart of a Find Format Pattern Process in accordance with a preferred embodiment of the present invention.

Turning now to FIG. 6, a flowchart of the Find Format Pattern is shown. This function returns all possible patterns within an array of strings "resultF4" that starts at position "startp", where the minimum length of pattern array is "lenp". In step 660, the function takes 3 parameters: an array of strings "resultF4", an integer startp that indicates the starting position to start a search in the array of strings "resultF4", and an integer "lenp", which defines the minimum length of the pattern. The function declares several variables: an array of strings "chain1", an array of strings "chain2", and an integer lennext=0.

The function returns an array of array of strings "resultF6".

In step 665, the function GetChain and returns its result in variable "chain1". The function "GetChain" returns all subsequent elements from resultF4 array, starting from the "startp" value and the length of "lenp" value. In step 670, the function GetChain returns result in variable "chain2". Three parameters are passed to the GetChain function: an array of strings "resultF4", the starting point equal to the sum of "startp" and "lenp", and the length "lenp" value. In step 675, the function sets the variable lennext equal to lenp. The variable lennext will be increased for the next loop. In step 680, the function checks if both the length of chain1 and the length of chain2 are not equal to "0". If both lengths are equal to "0", then control is passed to the end of the function in step 710.

In step 685, the function GetChain is called and the result is returned in variable "chain1". Three parameters are passed to GetChain: resultF4, startp, and lennext. In step 690, the function GetChain is called again and the result is returned in variable "chain2". Three parameters are passed to GetChain: resultF5, startp+lennext, and lennext.

In step 695, the function checks if every element in "chain1" equals the element in "chain2". Processing continues at step 700 if chain1==chain2 is true in step 695. In this case chain1 (or chain2) contains a pattern which needs to be added to the resulting array resultF6. In step 705, the function lennext is increased by the value "1" and the control passed back to step 680 to check if chain1 and chain2 are not empty arrays. If both arrays are empty, then processing continues in step 710 at the end of the function. In step 710, the function returns the resulting array of array of strings "resultF6".

Figure 7:
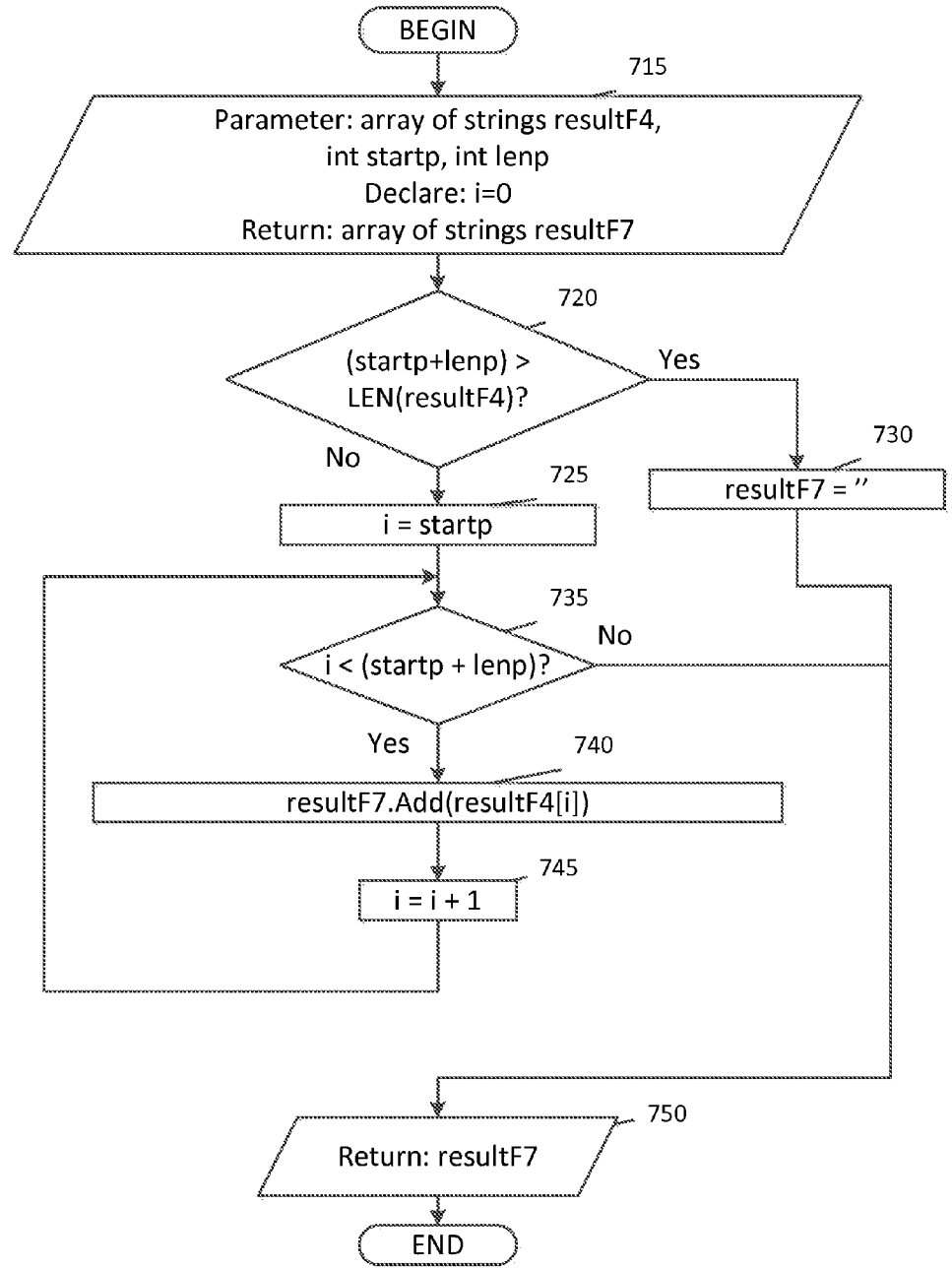
FIG. 7 is a flowchart of a GetChain Process in accordance with a preferred embodiment of the present invention.

FIG. 7 displays a flowchart of the GetChain function. This function returns all subsequent elements from the resultF4 array, starting from the "startp" value and the length of the "lenp" value. In step 715, the function "GetChain" accepts three parameters: an array of strings "resultF4", an integer "startp" which indicates from which element the function needs to start counting. The number of elements to return is defined by the parameter integer "lenp". The GetChain function declares parameter integer "i", and returns an array of strings "resultF7".

In step 720, the function checks if the sum of variables "startp" and "lenp" exceed the length of array of "resultF4". If so, the function sets the variable "resultF7" equal to an empty array (step 730), and returns the result in step 750 at the end of the function. In step 725, the function sets variable "i" to the value of "startp". In step 735, the function checks if "i" is less than the sum of "startp" and "lenp". If so, then the element of resultF4[i] is added to array resultF7 using the function Add element (step 740).

In step 745, the function increments variable "i" by "1" and continues the loop at step 735 by checking if "i" is less than the sum of "startp" and "lenp". In step 750, the function returns the array of strings "resultF7".

Figure 8A:
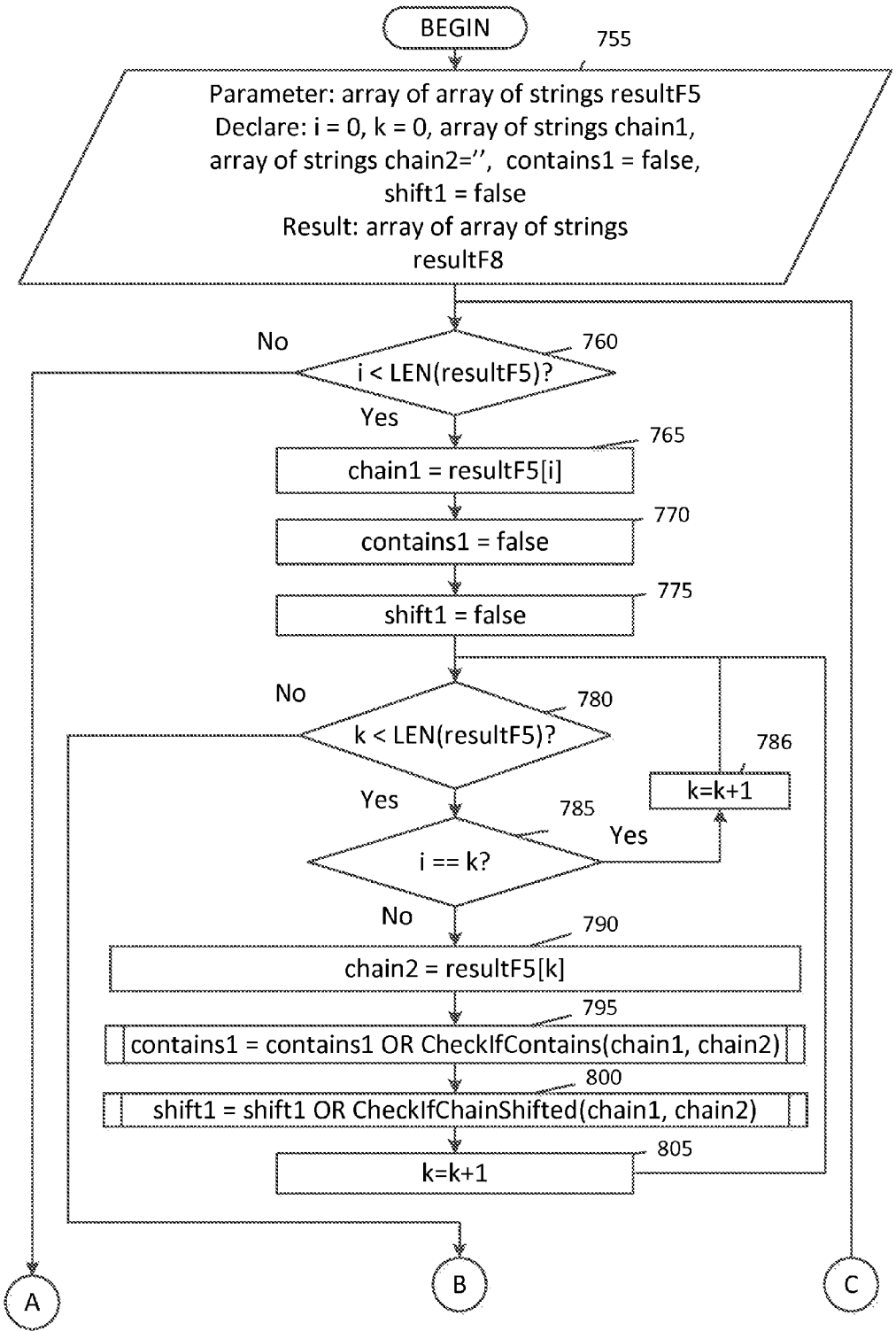
FIG. 8A is a flowchart of a Shrink All Chains Process in accordance with a preferred embodiment of the present invention.

Referring now to FIG. 8A, a flowchart of the Shrink All Chains function is shown. This function processes all "patterns" that were identified in FIGS. 5A & 5B, where the result array of string arrays "resultF5" is returned. The resultF5 array is "cleaned" removing all patterns that contain patterns of smaller size, and removing those patterns that can be generated by "shifting" the elements in another patterns.

For example, assume these two patterns exist:
"NUMBER"+"WORD"+"CHAR_."+"WORD"+"NUMBER"
and
"WORD"+"NUMBER".

The second pattern "WORD"+"NUMBER" is considered to be a subset of the first pattern "NUMBER"+"WORD"+"CHAR_."+"WORD"+"NUMBER".

The "CheckIfContains" function identifies such a case as this example.

In another example, assume that these two patterns exist:
"NUMBER"+"CHAR_."+"WORD"+"WHITESPACE"+"CHAR_;"
and
"CHAR_."+"WORD"+"WHITESPACE"+"CHAR_;"+"NUMBER"

In this case the second pattern represents the first pattern, except that all elements are shifted. The function "CheckIfChainShifted" is designed to identify such a case as this example.

In step 755, the function accepts one parameter: an array of array of strings "resultF5". The function declares several parameters: integer "i" whose value is set to "0, integer "k" whose value is set to "0, an array of strings chain1, an array of strings "chain2, a Boolean variable "contains1", and a Boolean variable "shift1". The function returns an array of array of strings "resultF8".

Figure 8B:
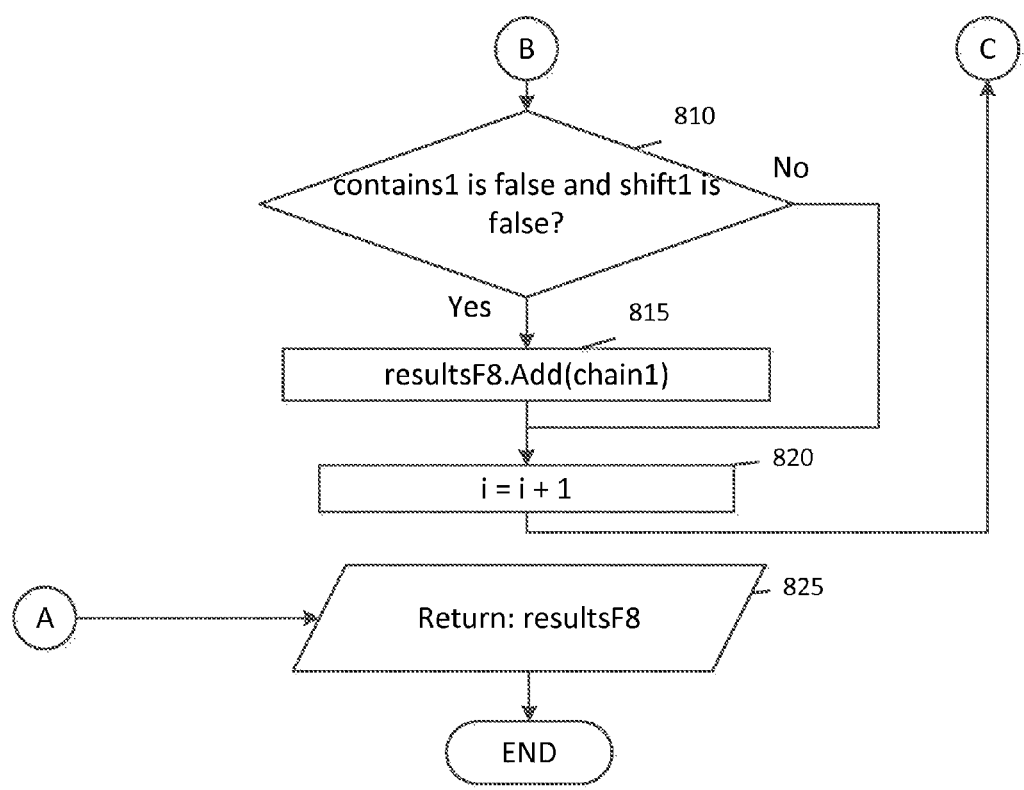
FIG. 8B is a flowchart of a Shrink All Chains Process in accordance with a preferred embodiment of the present invention.

In step 760, the function checks if "i" is less than the length of array "resultF5". If the value of "i" is greater than the length of "resultF5", then processing jumps to the end of the function at step 825 (FIG. 8B). In step 765, the function sets the value of chain1 to resultF5[i]. In step 770, the function initializes the value contains1 to "false". In step 775, the function initializes the value shift1 to "false".

In step 780, the function checks if the value of "k" is less than the length of array "resultF5". If "k" exceeds this value then processing jumps through connector B to step 810 (FIG. 8B) to check if contains1 and shift1 are both equal to false. In step 785, the functions checks if "i" is equal to "k". If so, then the value of the "k" variable is incremented by "1" (step 786), and processing continues at step 780. In step 790, the function sets the value of chain2 to resultF5[k]. In step 795, the function CheckIfContains is called, and the "OR" operator is applied to the function result and the variable contains1. The resulting value is applied to the contains1 variable. Two parameters are passed to CheckIfContains: chain1 and chain2. In step 800, the function CheckIfChainShifted is called, and the "OR" operator is applied to the function result and shift1. The resulting value is applied to the shift1 variable. Two parameters are passed to CheckIfChainShifted: chain1 and chain2. In step 805, the function increments the value of variable "k" by "1" and jumps to step 780.

Referring now to FIG. 8B, in step 810, the function checks if "contains1" and "shift1" are both "false". If so, processing continues at step 815, which adds chain1 to the array result "resultF8". In step 820, the function increments the value of "i" by "1" and processing continues at the main loop in step 760 (FIG. 8A) via connector C. In step 825, the function returns the array of array of strings "resultF8"

Figure 9A:
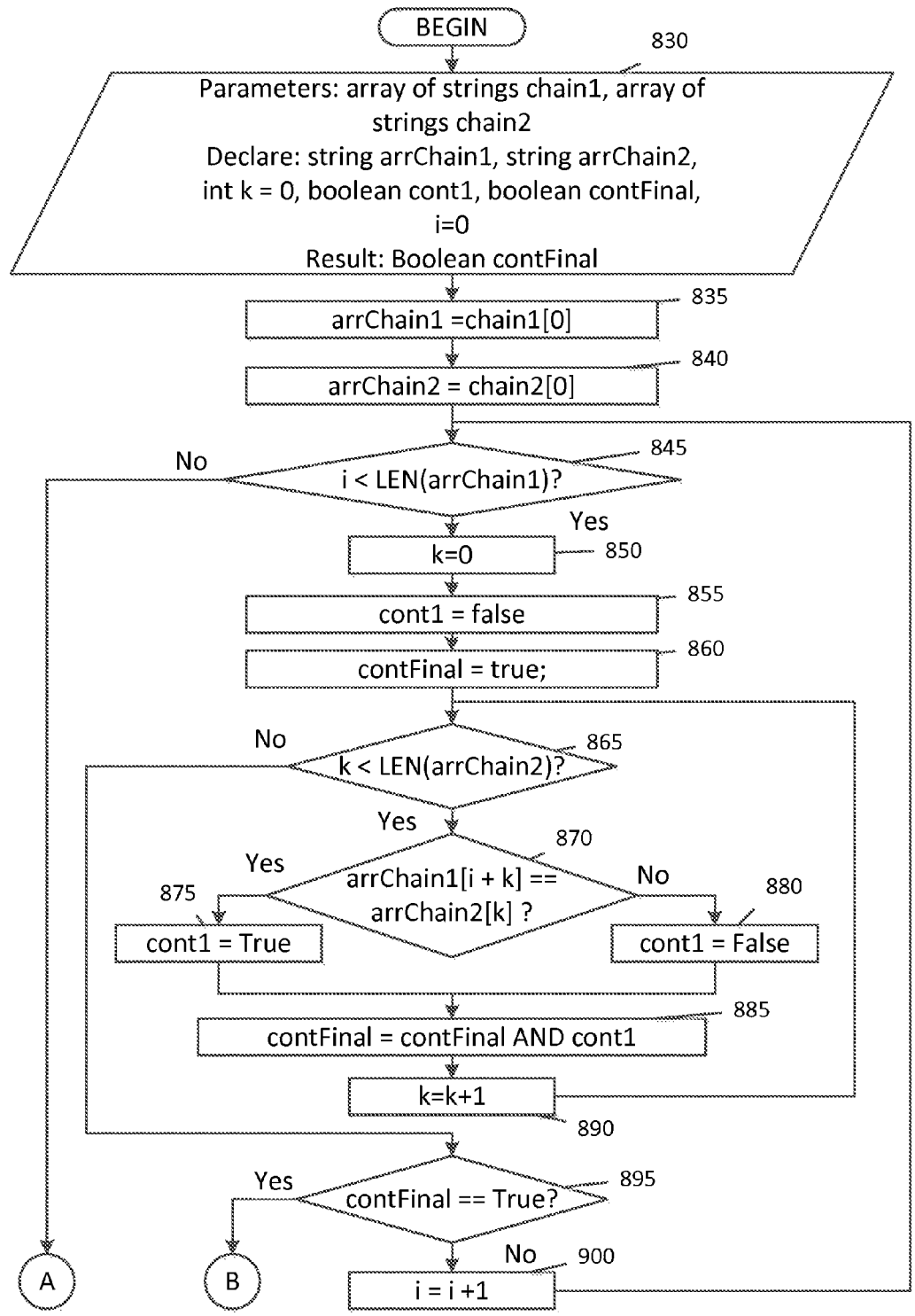
FIG. 9A is a flowchart of a Check If Contains Process in accordance with a preferred embodiment of the present invention.

Referring now to FIG. 9A, a flowchart of the "Check If Contains" function is shown. This function takes two arguments (step 830): an array of strings chain1 and an array of strings chain2. The function verifies if chain1 is a subset of the array of chain2. If chain1 is a subset of chain2 then the function returns a "true" value, otherwise it returns a "false" value.

In step 830, the function declares several variables: string arrChain1, the string arrChain2, the integer k=0, the Boolean contFinal, and the integer i=0. The function returns the Boolean contFinal.

In step 835, the function sets arrChain1 to the first element in chain1. In step 840, the function sets arrChain2 to the first element in chain2. In step 845, the function checks if "i" is less than the length of "arrChain1". If "i" exceeds this value, then the function continues at connector A. If "i" is less than the length of "arrChain1", processing continues at step 850. In step 850, the function sets the variable "k" to value "0". In step 855, the function sets the value of variable "cont1" to "false". In step 860, the function sets the value of variable "contFinal" to "true".

In step 865, the function check if "k" is less than the length of array arrChain2. If "k" is less than the length of array arrChain2, processing continues at step 870. Otherwise the function continues at step 895. In step 870, the function checks if arrChain1 [i+k] is equal to arrChain2[k]. If arrChain1[i+k] is equal to arrChain2[k], processing continues at step 875. Otherwise processing continues at step 880. In step 875, the function sets cont1 to value "true". In step 880, the function sets cont1 to value "false". In step 885, the function sets the value contFinal equal to the "AND" value of cont1 and contFinal. Thus contFinal will be true only in the event all values in the first array arrChain1 are equal to the subset of elements in arrChain2. In step 890, the function increments "k" by the value "1" and continues the loop at step 865. In step 895, the function checks if "contFinal" is "True". If "contFinal" is "True", processing continues at connector B. Otherwise (in step 900), the function increments the value of variable "i" by "1", and continues the main loop at step 845.

Figure 9B:
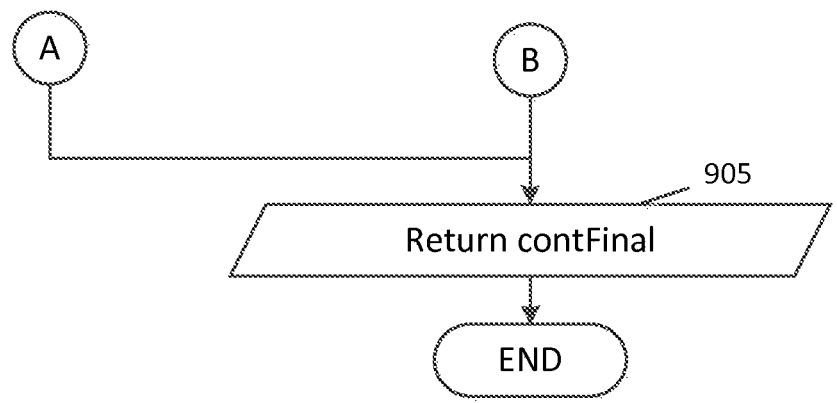
FIG. 9B is a flowchart of a Check If Contains Process in accordance with a preferred embodiment of the present invention.

Referring now to FIG. 9B, processing continues from Connector A and Connector B. In step 905, the function returns the value of "contFinal", and then ends.

Figure 10A:
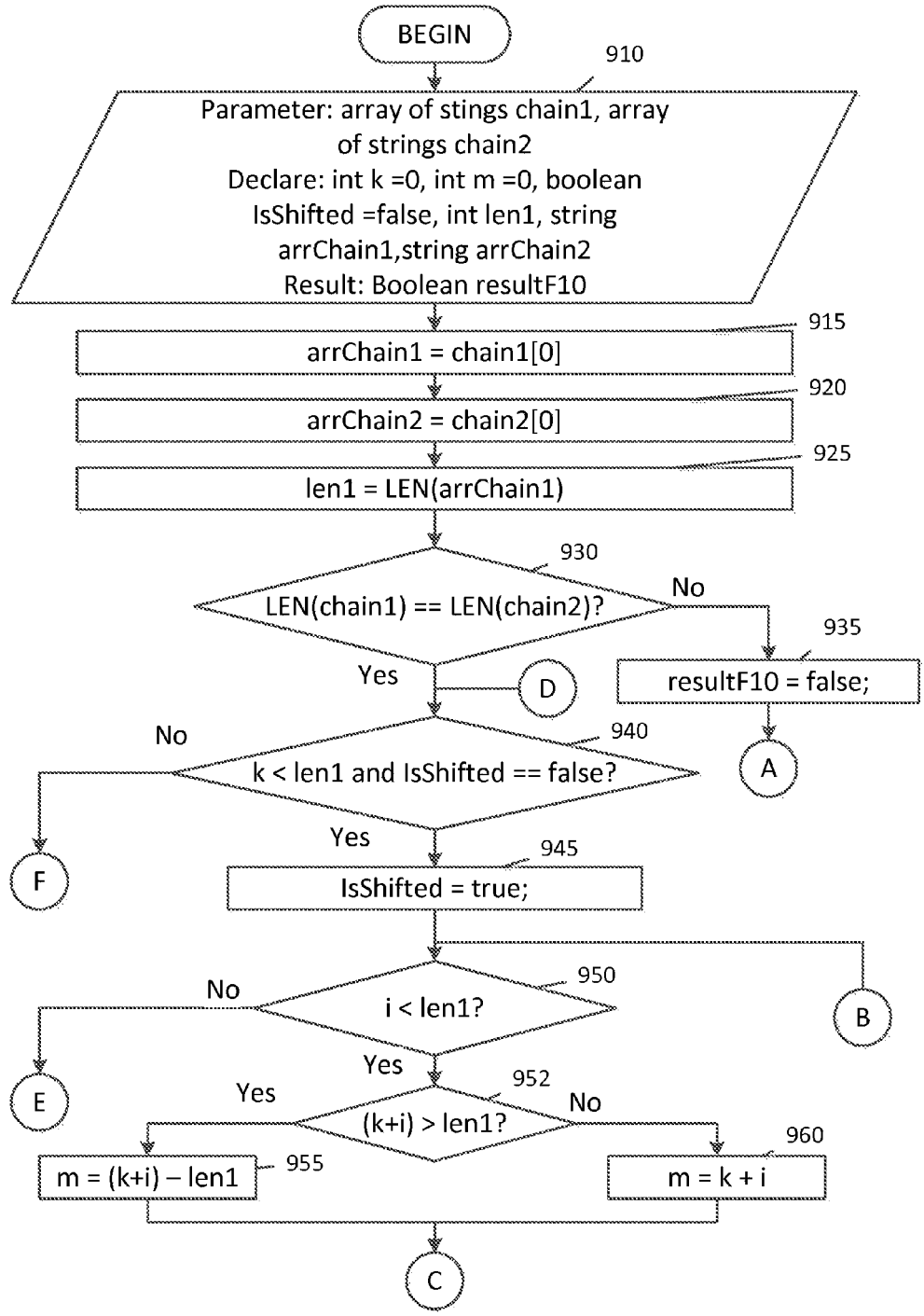
FIG. 10A is a flowchart of a Check If Chain Shifted Process in accordance with a preferred embodiment of the present invention.

In FIG. 10A, a flowchart of the Check If Chain Shifted function is shown. This function examines two arrays of strings and verifies if one array is present in another array by "shifting" all elements in the second array.

In step 910, the function accepts two parameters: chain1 and chain2, and the function declares several variables: int k=0, integer m=0, Boolean IsShifted=false, int len1, string arrChain1, and string arrChain2. The function returns Boolean value resultF10.

In step 915, the function sets the variable arrChain1 to the first element of array chain1.

In step 920, the function sets the variable arrChain2 to the first element of array chain2.

In step 925, the function sets the variable len1 to the length of the array chain1. In step 930, the function checks if the length of chain1 equals the length of chain2. If they are not equal then resultF10 is set to false (step 935) and the function jumps to the function exits at connector A.

In step 940, the function checks if the variable k is less than len1 and if the variable IsShifted is equal to "false". If so, the function continues at step 945. Otherwise the function exits at Connector B. In step 945, the function sets the variable "IsShifted" to the value "true". In step 950, the function checks if the variable "i" value is less than len1. If so, the function continues at step 952. Otherwise the function continues at Connector E. In step 952, the function checks if the value of the sum of "k" and "i" is greater than len1. If so, the function continues at step 955. Otherwise the function continues at step 960. In step 955, the function sets the variable m=(k+i)−len1, so if (k+i) exceeds the value of len1, then next element to compare is the first element of the array. In step 960, the function sets the variable m=k+i. Continue looping all elements one by one and continue comparing values. After step 955 or step 960, the function continues at Connector C.

Figure 10B:
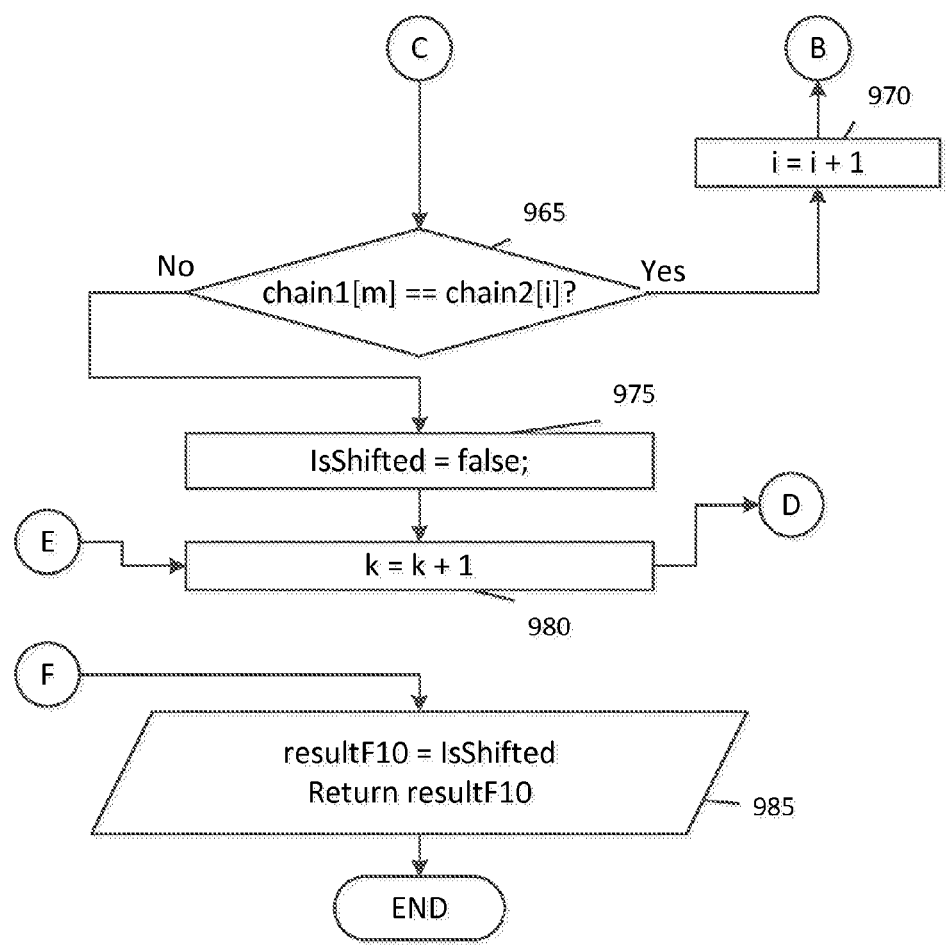
FIG. 10B is a flowchart of a Check If Chain Shifted Process in accordance with a preferred embodiment of the present invention.

Referring now to FIG. 10B, in step 965, the function checks if the variable chain1 [m]=chain[i]. If these values are equal then the function continues to step 970, and we can consider a potential case when one array is the subset of another array. If the values are not equal then the function continues to step 975. In step 970, the function increments the value value of the variable "i" by "1" and continues the loop at Connector B. In step 975, the function sets the value of "IsShifted" to "false". In step 980, the function increments the value of variable "k" by one and jumps to step 940 (FIG. 10A), which checks if "k<len1 and IsShifted=false"? In step 985, the function sets the variable "resultF10" to the value of "IsShifted" and returns this value.

Figure 11A:
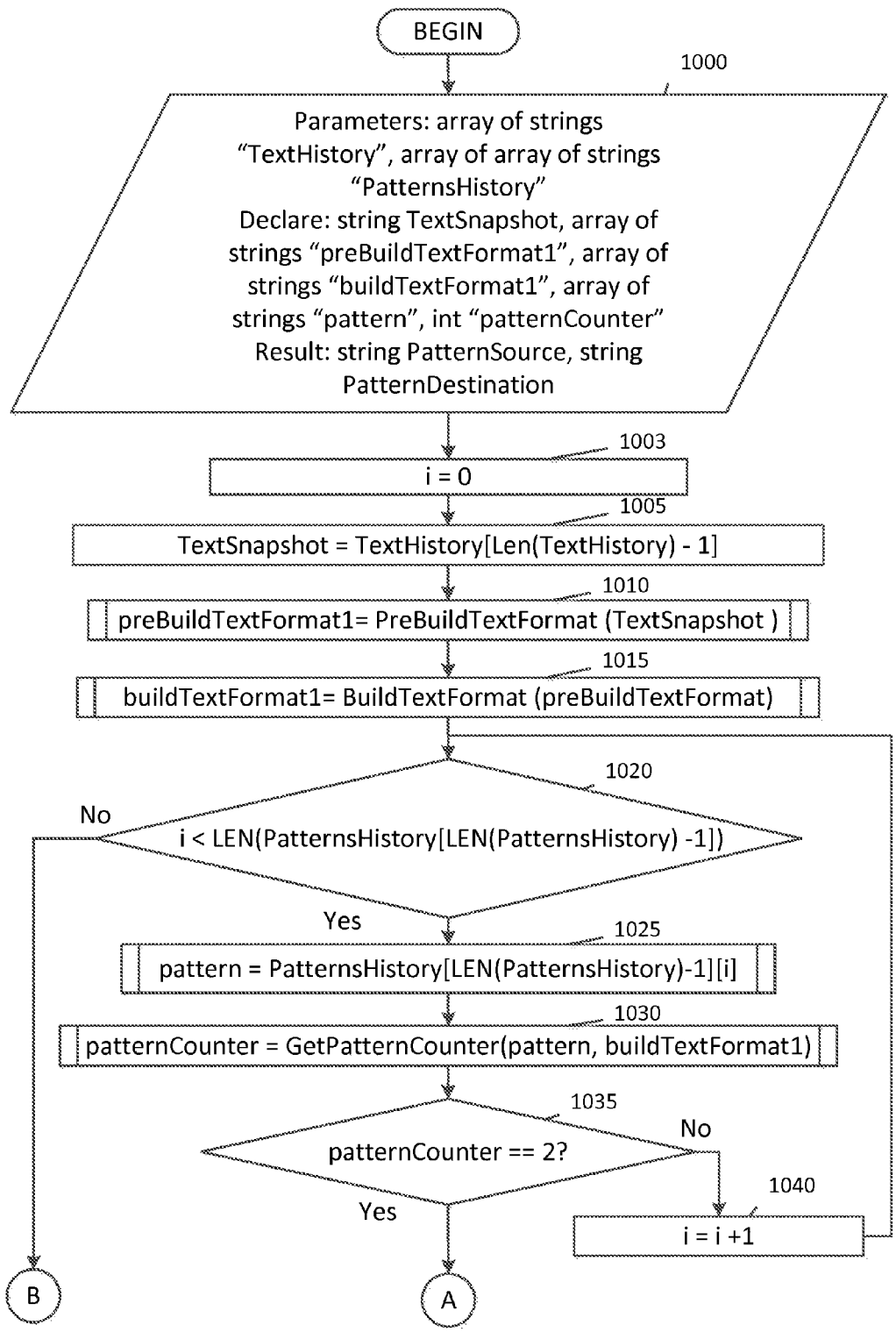
FIG. 11A is a flowchart of a Pattern Analyzer Process in accordance with a preferred embodiment of the present invention.

In FIG. 11A, a flowchart of the Pattern Analyzer function is shown. This function accepts 2 parameters: an array of strings "TextHistory", and an array of array of strings "PatternHistory". The function analyzes patterns and identifies the PatternSource and the PatternDestination, so the text that matches PatternSource can be automatically "transformed" to a new text that matches the PatternDestination. This function doesn't perform any transformation, rather its purpose is to find the PatternSource and the PatternDestination only.

In step 1000, the function accepts 2 parameters: an array of strings TextHistory and an array of arrays of strings "PatternsHistory". The function declares several variables: a string TextSnapshot, an array of strings preBuildTextFormat1, an array of strings buildTextFormat, an array of strings "pattern", an integer patternCounter, and an integer i=0. The function returns 2 strings: a string PatternSource, and a string PatternDestination.

In step 1003, the function sets i equal to 0. In step 1005, the function TextHistory sets TextSnapshot to the value of the latest TextHistory element (or the latest snapshot of the editing text), ie TextShapshot=TextHistory[Len(TextHistory)−1]. In step 1010, the function calls the PreBuildTextFormat and passes one parameter, TextSnapshot. The result is returned in the array of strings preBuildTextFormat1. In step 1015, the function calls function BuildTextFormat and passes one parameter, preBuildTextFormat1. The result is returned in the array of strings buildTextFormat1. In step 1020, the function checks if "i" is less than the length of the array of the latest array in PatternHistory:

i<LEN(PatternsHistory[LEN(PatternsHistory)−1])

If "i" is greater than length of this array, then the function jumps to the end of the function at Connector B. Otherwise the function continues with step 1025. In step 1025, the function continues execution and sets the value of variable "pattern" to PatternsHistory[LEN(patternsHistory)−1][i]. Basically the function loops through every array in the array of patterns for the last snapshot of the text. In step 1030, GetPatternsCounter is the function that calculates the number of entries of the array of strings "pattern" in the "buildTextFormat1" array. This number must be at least "2" or greater. The result returned is assigned to variable "patternCounter". In step 1035, the function checks if patternCounter is equal to "2". If patternCounter is equal to "2", that means the patternDestination has been found, so the function continues at Connection A.

Otherwise if patternCounter is not equal to "2", (step 1040) the function increments the value of "i" by "1" and processing continues at step 1020.

Figure 11B:
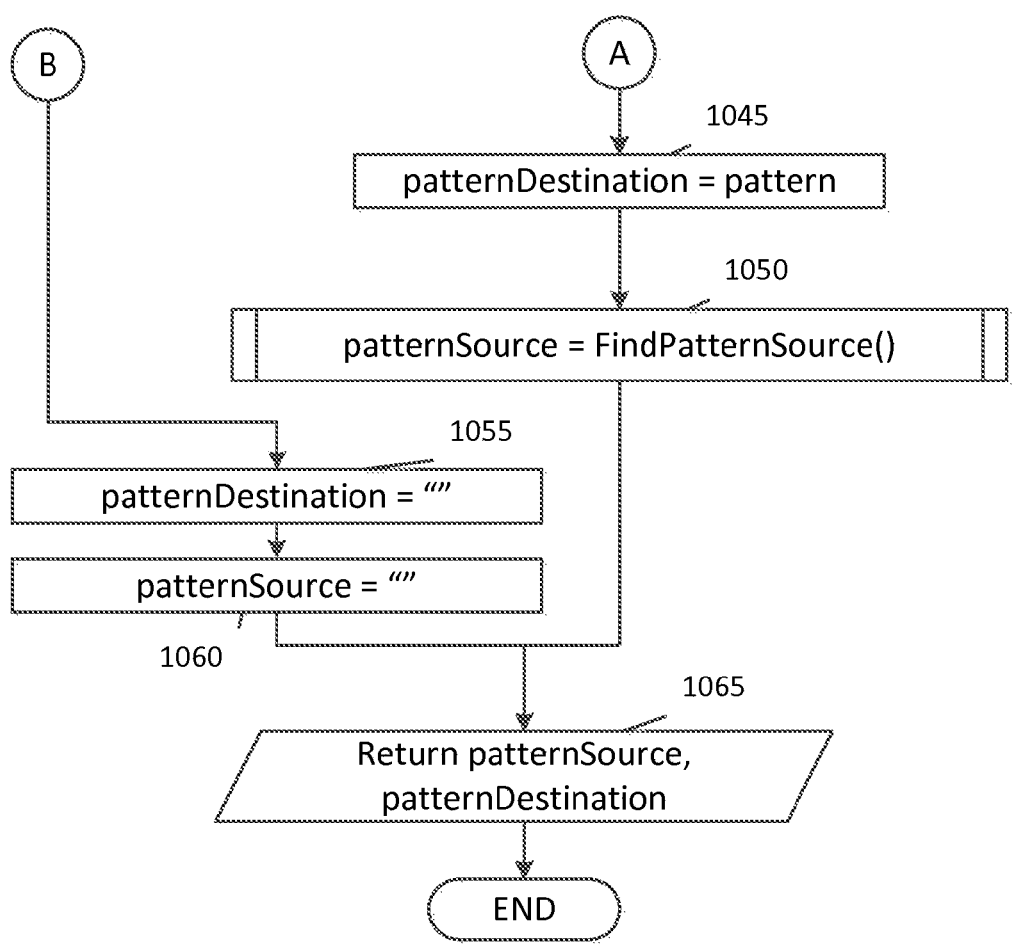
FIG. 11B is a flowchart of a Pattern Analyzer Process in accordance with a preferred embodiment of the present invention.

Referring to FIG. 11B, processing continues from Connectors A & B. In step 1045, if patternCounter is equal to "2", then patternDestination is set equal to pattern, so at step 1050 the function FindPatternSource is called, which returns the variables patternSource and patternDestination (step 1065). Processing then exits the function.

In step 1055, no new patterns were found with the pattern counter equal to "2" so no new patterns were found. The variables patternDestination and patternDestination are set equal to ' '' ' (steps 1055 & 1060). Processing then exits the function.

Figure 12A:
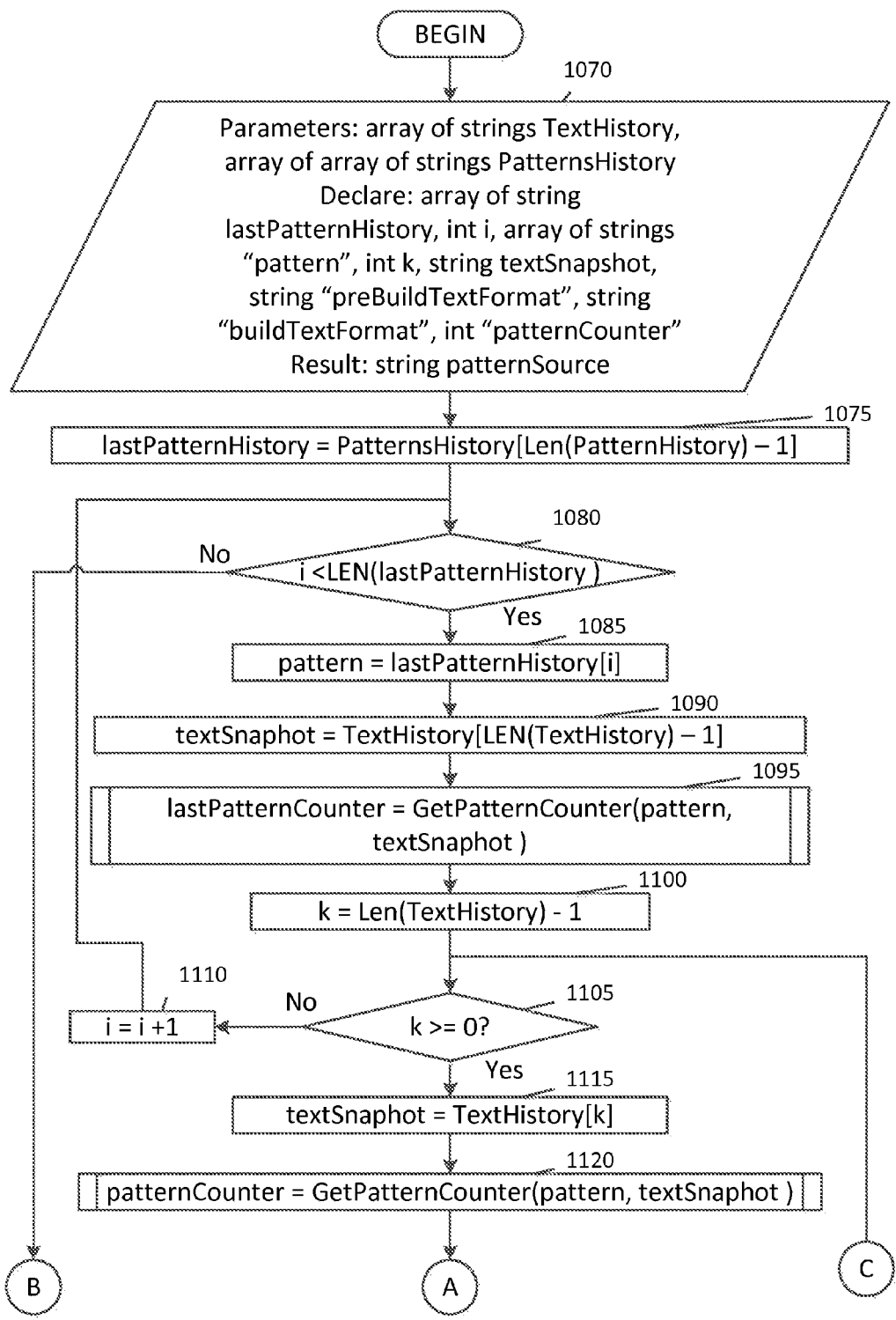
FIG. 12A is a flowchart of a Find Pattern Source Process in accordance with a preferred embodiment of the present invention.

Referring to FIG. 12A, a flowchart of the Find Pattern Source function is shown. This function is designed to process the TextHistory variable and find source patterns, where the pattern counter has decreased by "2". This means that the text region has been modified by a user and a new destination pattern for this text region appears. However previously this text region has been covered by a source pattern.

In step 1070, the function accepts 2 parameters: an array of strings TextHistory and an array of array of strings PatternsHistory. The function declares several variables: an array of strings "lastPatternHistory", an integer "i", a string "pattern", an integer "k", a string "textSnapshot", and an integer "patternCounter". The function returns string "patternSource". In step 1075, the function sets the value of the array lastPatternHistory to the last element (array) of PatternsHistory: lastPatternHistory=PatternsHistory[Len(PatternHistory)−1].

In step 1080, the function checks if "i" is less than the length of lastPatternHistory. If the value of "i" exceeds the length, then processing jumps to the end of the function at Connector "B". In step 1080, if "i" is less than the length of lastPatternHistory, the function continues the loop at step 1085: the array variable "pattern" is set equal to lastPatternHistory[i].

In step 1090, the function sets the value of textSnapshot to the latest text snapshot. In step 1095, the function calls GetPatternCounter and returns the value to lastPatternCounter. Two parameters are passed to GetPatternCounter: pattern and textSnapshot. In step 1100, the function sets the variable "k" to the length of the TextHistory array minus 1, so that the value of variable "k" will be decreased through every iteration in the loop. In step 1105, the function checks if the value of "k" is greater than or equal to "0". In step 1105, the function checks if the value of "k" is greater than or equal to "0". If it is not, then the value of "i" is incremented by 1 and the function jumps back to step 1080. In step 1105, if the value of "k" is greater than or equal to "0", then the function continues at step 1115.

In step 1115, the function sets the value of textSnapshot to the value of TextHistory[k]. The function basically iterates through every text snapshot of the TextHistory variable.

In step 1120, the function calculates the pattern counter of the current pattern in textSnapshot by calling function GetPatternCounter and passing 2 parameters: "pattern" and "textSnapshot". The result is returned into "patternCounter". The function then exits at Connector A.

Figure 12B:
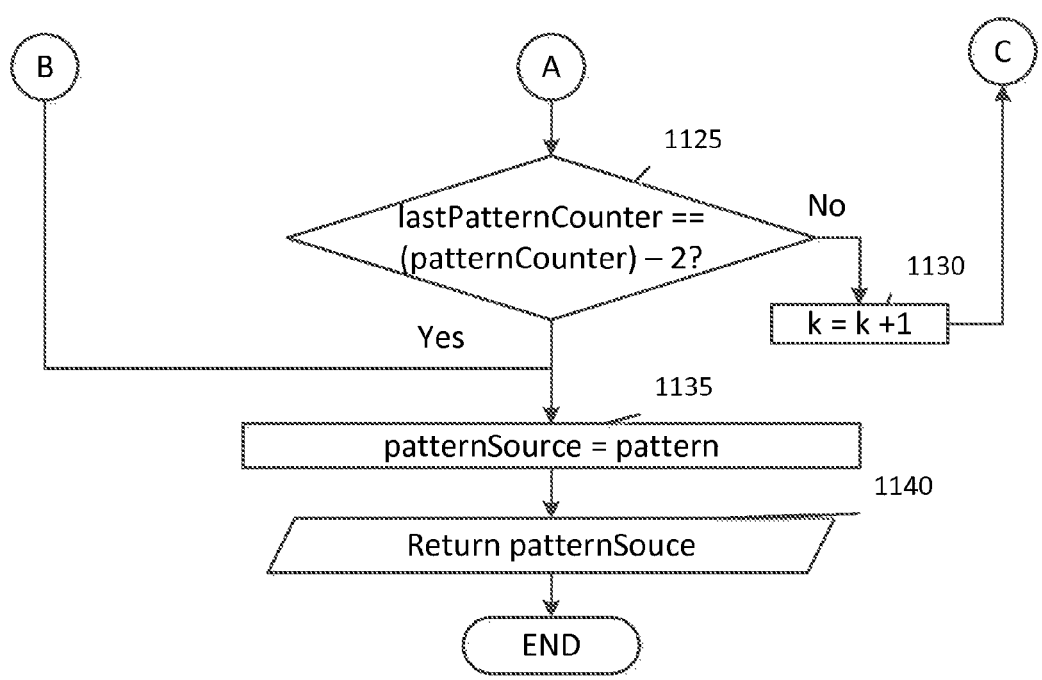
FIG. 12B is a flowchart of a Find Pattern Source Process in accordance with a preferred embodiment of the present invention.

Referring to FIG. 12B, in step 1125 the function checks if the lastPatternCounter is equal to "patternCounter" minus "2". If so, then the patternSource is found, and the function continues at step 1135. If the lastPatternCounter is not equal to "patternCounter" minus "2", then in step 1130, the function increments k by the value "1" and continues to the next iteration at Connector C. In step 1135, the function the value of "patternSource" is set to "pattern". In step 1140, the function returns "patternSource" and ends.

Figure 13A:
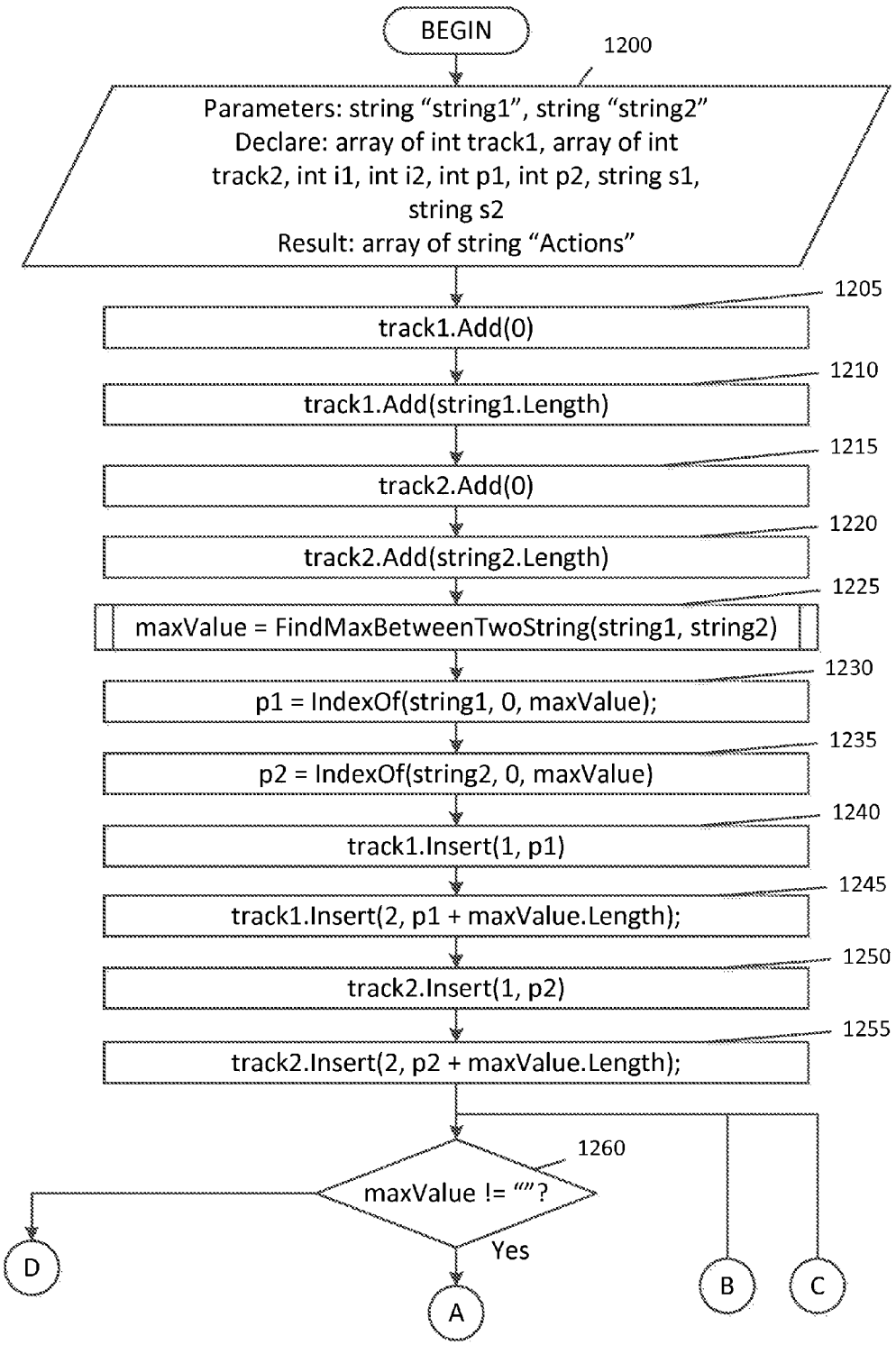
FIG. 13A is a flowchart of a Build Transformation Script Process in accordance with a preferred embodiment of the present invention.

Referring to FIG. 13A, the flowchart for a Build Transformation Script is shown.

This function is a "transformation" script to "transfer" one string to another. Here is an algorithm for this type of function:

stringSource="1. Peter=1945;"
stringDestination="1 Peter−1945;!"

The idea of this function is to create a script that converts stringSource to stringDestination. This script can only "Add" or "Delete" characters within stringSource at a specific position. The script in this particular case will appear as follows:

1. delete at: 1: content: .
2. delete at: 7: content: =
3. add at: 7: content: -
4. add at: 16: content: !

The "Update" operation can be presented as a "Delete"-"Add" combination. The 2nd and 3rd steps represents such a case.

The position in a script is considered as the absolute position within the original string. This is important, because during changes the length of stringSource might change: for example "delete at: 1: content: ." decrease the length of the stringSource.

In step 1200, the function accepts two parameters: "string1" and "string2". This function is designed to build a script to convert "string1" to "string2", by generating an array of stings "Actions" similar to the script described above. In step 1205, the function track1 is an array of integers and it is designed to store in string1 the sequence of "identical" strings between string1 and string2, and "non-identical" strings between string1 and string2. There is a similar purpose for track2 which stores positions in string2. A value of "0" is added to Track1 as a starting point. In step 1210, the function adds to track1 another position–the length of string1. In step 1215, the function adds to track2 the starting position: track2.add(0). In step 1220, the function adds to track2 the ending position: the length of string2. In step 1225, the function FindMaxBetweenTwoString is designed to find the maximum length of two strings. MaxValue is assigned the result of the function FindMaxBetweenTwoString, and passed 2 parameters: string1 and string2.

In step 1230, the function "IndexOf(stringSource, stringPosition, stringSeek)" is a standard function to determine the "stringSeek" position inside of stringSource, starting with stringPosition. The result p1 of calling IndexOf is returned. In step 1235, the function returns the result of the function call IndexOf into variable p2. These parameters are passed: string2, 0, maxValue. In step 1240, the function "Insert(intPosition, intValue)" inserts the value "intValue" inside the array track1 at position "intPosition". Thus the statement "track.Insert(1, p1)" inserts into array "track1" value p1 at position "1". In step 1245, the function inserts the sum of "p1" and the length of maxValue into track1 at position 2. In step 1250, the function inserts the value p2 into the track2 array at position 1. In step 1255, the function inserts the sum of "p2" and the length of maxValue into track2 at position 2. In step 1260, the function controls the main loop by checking if check if maxValue is not equal to value " " (empty string). This means there are no more identical parts between string1 and string2. The purpose is to keep track of identical parts and store them in track1 and track2 arrays, and continue until there are no more "identical" parts between the two strings. Track1 and track2 will then contain the position of the identical parts, and their position and the "non-identical" parts as well. The function continues at either Connector D or Connector A depending on the decision in step 1260.

Figure 13B:
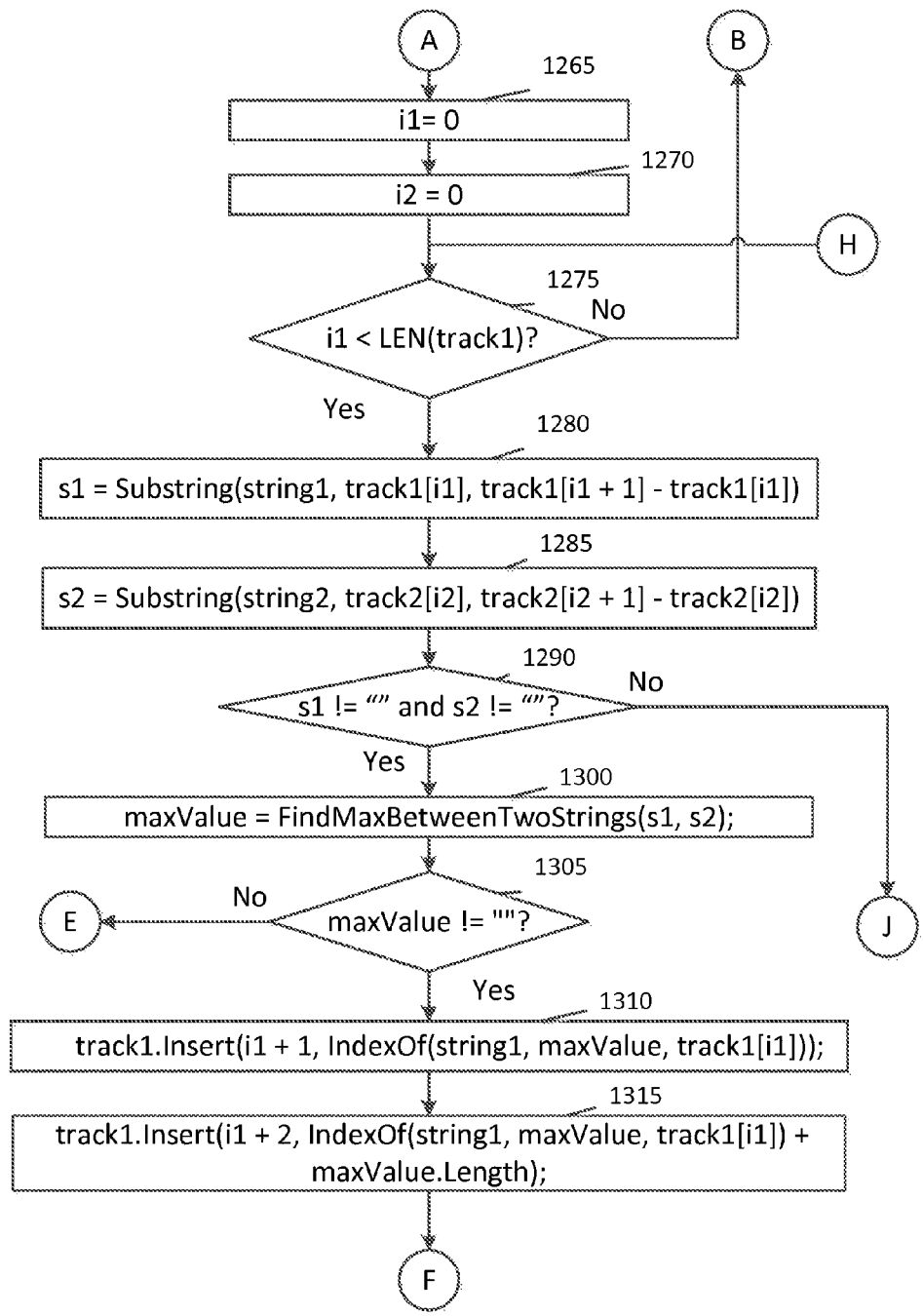
FIG. 13B is a flowchart of a Build Transformation Script Process in accordance with a preferred embodiment of the present invention.

Referring now to FIG. 13B, in step 1265, if the maxValue string is not empty (step 1260), the the main loop continues and i1 is initialized to 0. In step 1270, the function initializes i2 to 0. In step 1275, the function checks if "i1" is less than the length of array "track1". The array track1 is constantly increasing in length as the insert statements cause the length of the "track1" array to be increased by "1". This continues until there are no more "identical" parts between string1 and string2. If "i1" exceeds the length of "track1", then the function continues at step 1260 (FIG. 13A), and then jumps to the end of the function.

In step 1280, the function "Substring(stringSource, stringStartPosition, stringLength)" is designed to extract from stringSource a sequence of characters from the starting position "stringStartPosition". The number of extracted characters is "stringLength". This sub-sequence of characters is converted to a string. The function call Substring(string1, track1[i1], track1[i1+1]–track1[1]) basically extracts from string1 all characters that need to be compared and then iterates through the main loop to check if there are another "identical" parts between two strings. The result of this function call is assigned to variable s1.

In step 1285, the function applies the Substring function to the track 2 array and the string2, but the result of this function is stored in variable s2.

In step 1290, the function checks if both s1 and s2 are not equal to empty string ' '. If one of the strings is empty, then control continues at Connection point "J". This means there is a "non-identical" part between two strings in string1 and string2. If s1 is empty, then "Actions" will be added by a pure "Add" operation. If s2 is an empty string, the "Actions" array will be added by a pure "Delete" operation.

In step 1300, the function finds the max value between s1 and s2 and assigns this value to the maxValue variable. In step 1305, the function checks if maxValue is an empty sting. If maxValue is an empty string then this is a pure "Update" operation that can be split into "delete" and "add" operations. Processing then flows to Connector "E". If maxValue is not an empty string, the function continues to step 1310, where the function inserts maxValue into the track1 position of maxValue within string1 starting from track1[i1]. The function inserts the "i1+1" position inside of track1.

In step 1315, the function inserts another value into track2, ie the position of maxValue+length of maxValue, and the function inserts the position equal to "i1+2". Processing continues through Connector F.

Figure 13C:
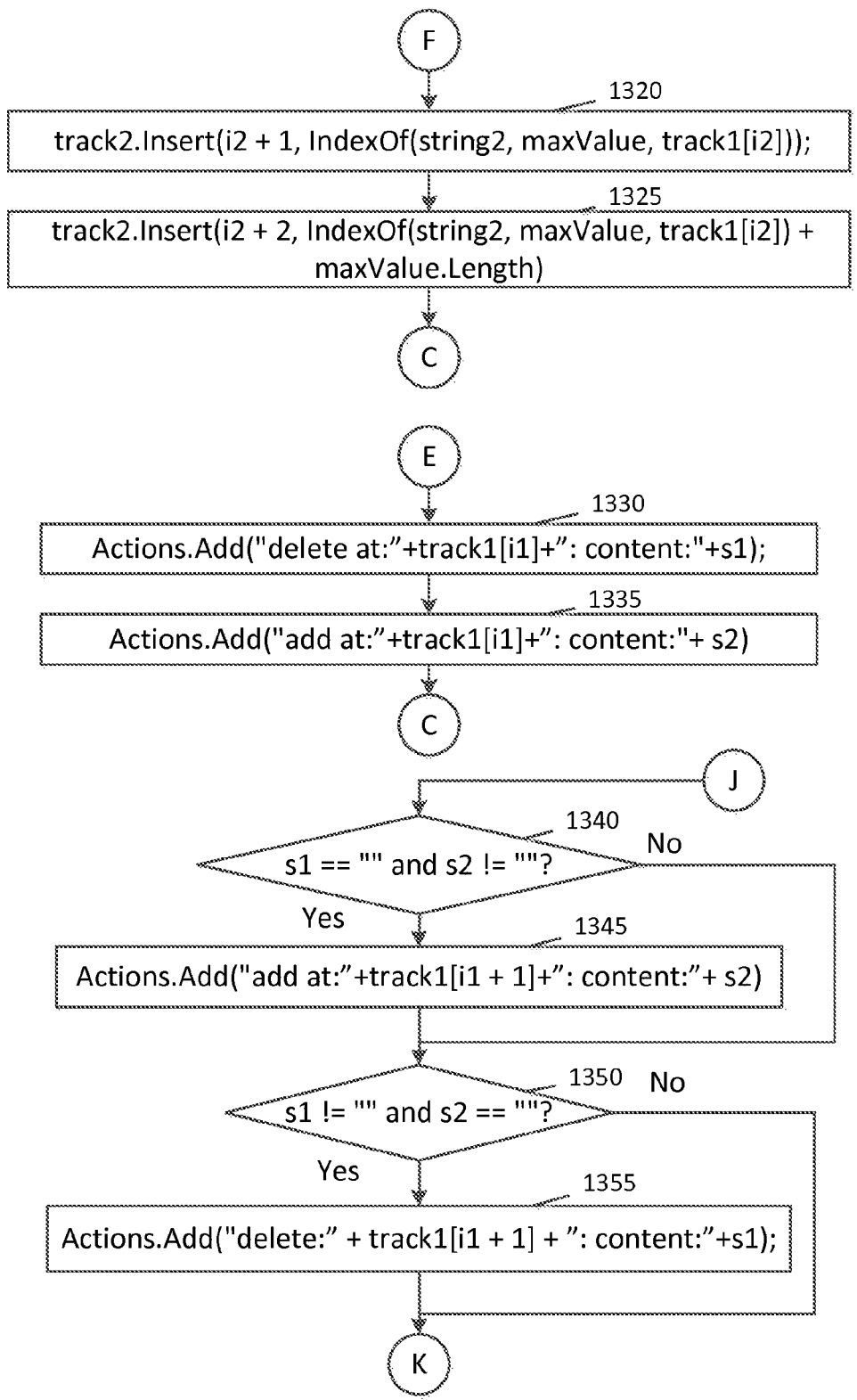
FIG. 13C is a flowchart of a Build Transformation Script Process in accordance with a preferred embodiment of the present invention.

Referring now to FIG. 13C, in step 1320, the function continues from Connector F. The following function is applied to the track2 array:

track2.Insert(i2+1, IndexOf(string2, maxValue, track1[i2])). In step 1325, the function. The function is applied again to the track2 array with a different parameter:

track2.Insert(i2+2, IndexOf(string2, maxValue, track1[i2])+maxValue.Length)

Processing then continues at Connector C and control returns to the main loop to perform another iteration and check if maxValue is empty or not.

In step 1330, processing has continued from Connector E. The function refers to step 1305, ie this is considered a pure "Update" operation, where a new element needs to be added to the "Actions" array: Actions.Add("delete at:"+track1[i1]+": content:"+s1); where s1 doesn't exist in string2. In step 1335, the function is a continuation of step 1330 and a new element needs to be added to the "Actions" array:

Actions.Add("add at:"+track1[i1]+": content:"+s2);, where s2 doesn't exists in string1. Processing then continues through Connector C.

In step 1340, processing continues from Connector J. The function refers to step 1290. This section applies only if s1 is an empty string and s2 is not an empty string. If so, the function continues at step 1345, otherwise the function continues at step 1350. In step 1345, the function a new element needs to be added to the "Actions" array:

Actions.Add("add at:"+track1[i1+1]+": content:"+s2). In step 1350, the function checks if s1 is not an empty string and s2 is an empty string. If so, execution continues at step 1355. Otherwise execution continues at Connector K. In step 1355, the function adds a new element to the "Actions" array:

Actions.Add("delete:"+track1[i1+1]+": content:"+s1).

Figure 13D:
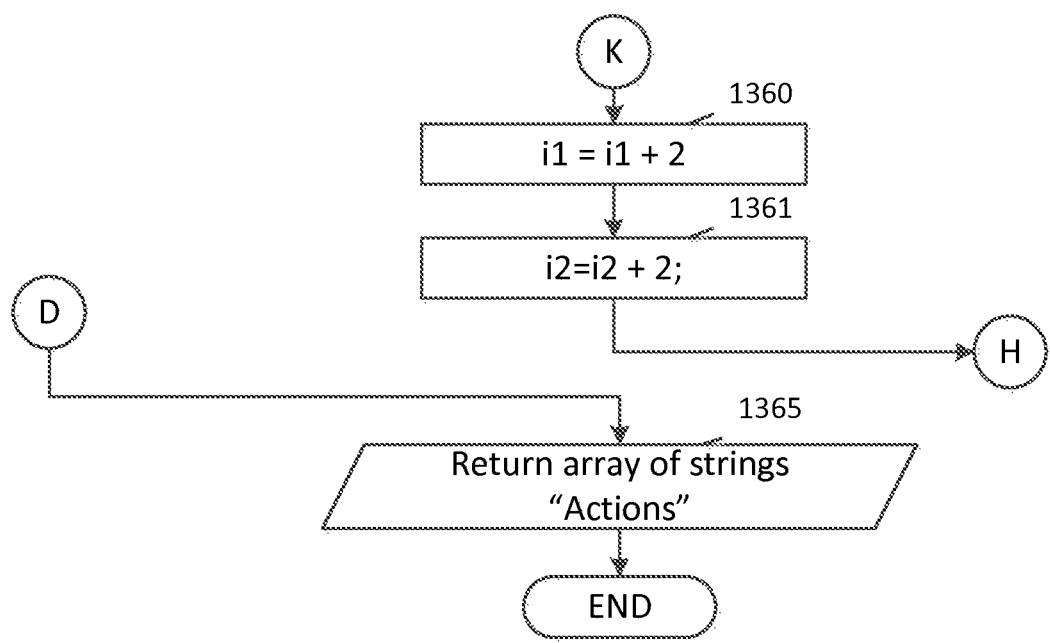
FIG. 13D is a flowchart of a Build Transformation Script Process in accordance with a preferred embodiment of the present invention.

Referring now to FIG. 13D, in step 1360, the function increments variable "i1" by "2". In step 1361, the function increments variable "i2" by value "2" and execution continues at Connector H. In step 1365, execution continues from Connector D, and the function returns an array of strings "Actions", and the function ends.

Figure 14A:
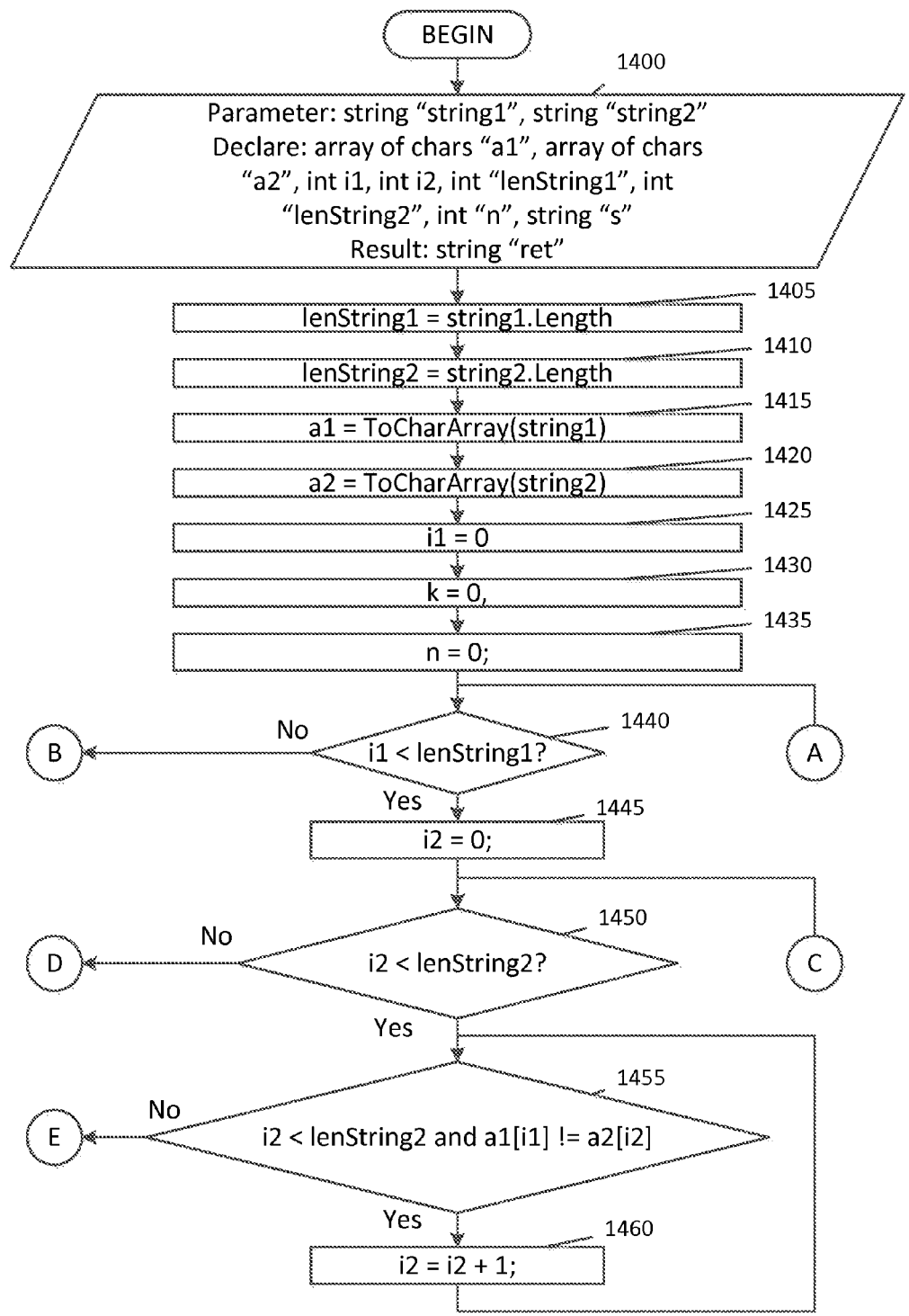
FIG. 14A is a flowchart of a Find Max Between Two Strings Process in accordance with a preferred embodiment of the present invention.

Referring now to FIG. 14A, a flowchart of the Find Max Between Two Strings function is shown. This function takes 2 parameters: "string1" and "string2". The purpose of this function is to find the string that is a sub-string for both string1 and string2 and has the maximum length compared to other substrings.

In step 1400, the function. Function takes 2 parameters: string "string1" and string "string2". The function declares several variables: array of chars a1, array of chars chars2, integer i1, integer i2, integer lenString1, integer lenString2, integer n, and string s.

The function returns string "ret". In step 1405, the function sets the value of variable lenString1 to the length of string1. In step 1410, the function sets the value of variable lenString2 to the length of string2. In step 1415, the function calls the function ToCharArray which splits string1 into a char array.

This function takes only one parameter type of "string". The result is copied to a1. In step 1420, the function calls the function ToCharArray and passes parameter string2. The result is copied into variable a2.

In step 1425, the function sets i1=0. In step 1430, the function sets k=0. In step 1435, the function sets n=0.

In step 1440, the function checks if the value of variable "i1" is less than lenString1. If not, the function continues through Connector B. If "i1" is less than the value of "lenString1", the function continues in step 1445. In step 1445, the function assigns i2 the value "0". In step 1450, the function checks if the value of variable "i2" is less than lenString2. If so, then the function continues at step 1455. If "i2" exceeds the lenString2, the function continues through Connector D so that value "i1" is incremented by "1". In step 1455, the function checks if i2<lenString2 and if a1[i1] is not equal to a2[i2]. If so, then continue through this loop until equal elements are found in string1 and string1.

In step 1460, the function increments the value of "i2" by "1" and does the next iteration.

Figure 14B:
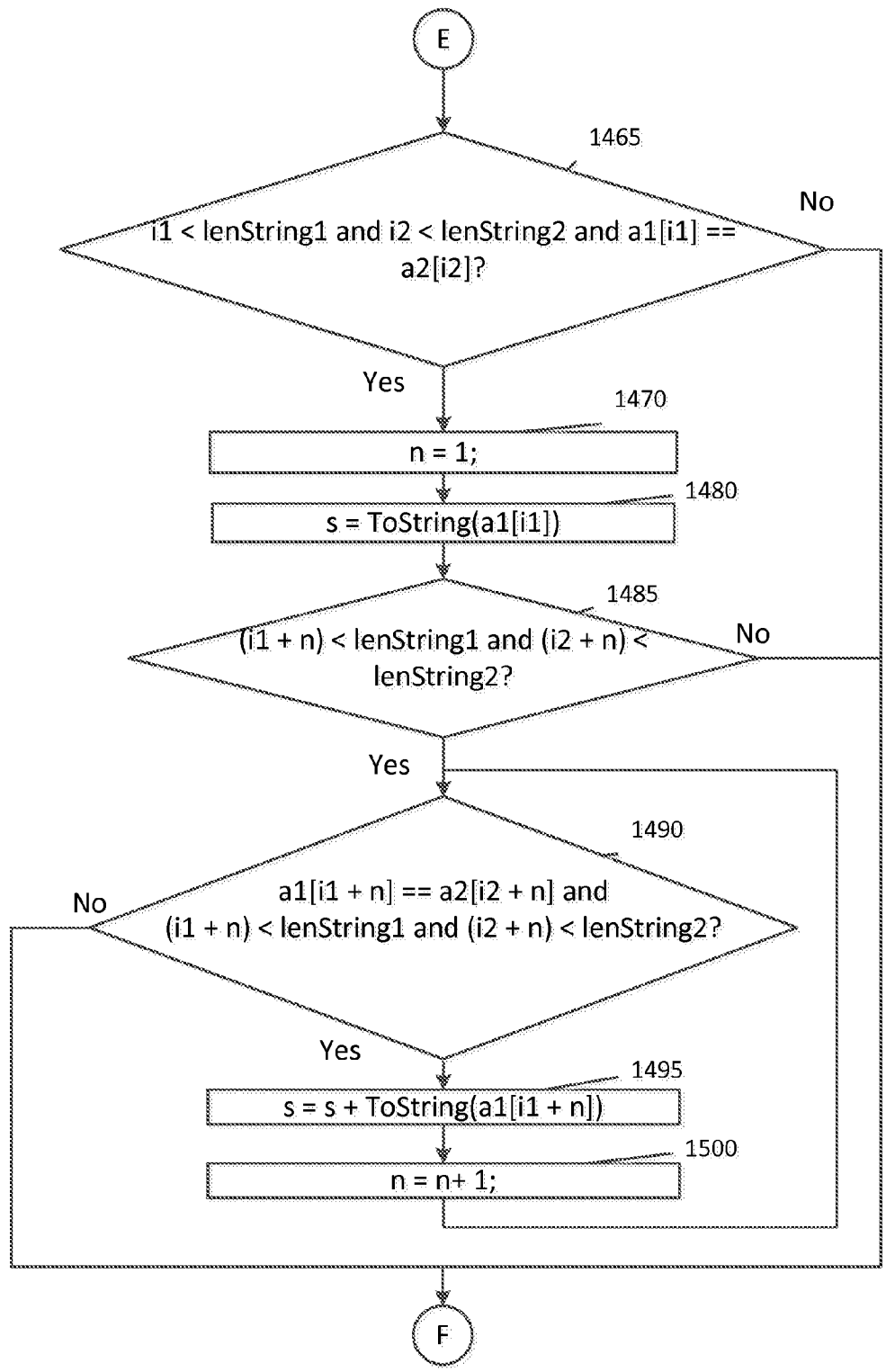
FIG. 14B is a flowchart of a Find Max Between Two Strings Process in accordance with a preferred embodiment of the present invention.

Referring to FIG. 14B, the function continues from Connector E. In step 1465, a1[i1] is now equal to a2[i2]. The next statement checks if i1 is less than lenString1 and if i2 is less than lenString2 and if a1[i1] is equal to a2[i2]. If so, the function continues at step 1470. In step 1470, the function sets n to value "1". In step 1480, the function calls function ToString and passes one parameter a1[i1] to convert char a1[i1] to a string type and then assigns this value to variable "s". In step 1485, the function checks if (i1+n) is less than lenString1 and if (i2+n) is less than lenString2. If so, the function continues at step 1490. In step 1490, the function checks if a1[i1+n] equals a2[i2+n] and if (i1+n) is less than lenString1 and if (i2+n) less then lenString2. If so, the function continues at step 1495. In step 1495, the function continues the loop and s is assigned the value (s+ToString(a1[i1+n])). In step 1500, the function increases n by the value "1" and continues the iteration.

Figure 14C:
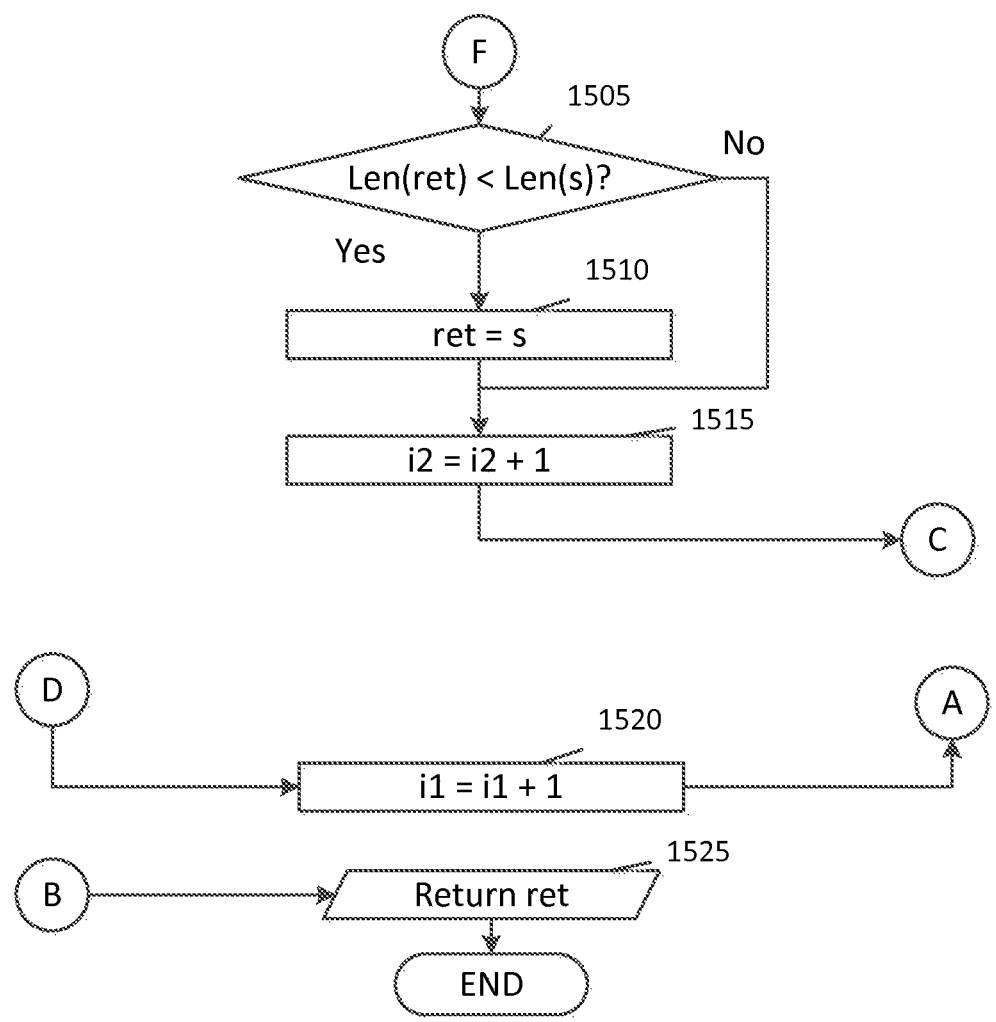
FIG. 14C is a flowchart of a Find Max Between Two Strings Process in accordance with a preferred embodiment of the present invention.

Referring to FIG. 14C, in step 1505 the function checks if the length of "ret" is less then the length of "s". If so, the function continues at step 1510. If "ret" is greater than "s" then the function continues at step 1515. In step 1510, the function assigns ret the value of "s". In step 1515, the function increments the value of "i2" by the value "1" and continues the loop through Connector C.

In step 1520, the function increments the value of "i1" by value "1" and continues the loop through Connector A. In step 1525, the function returns the value of variable "ret".

Figure 15:
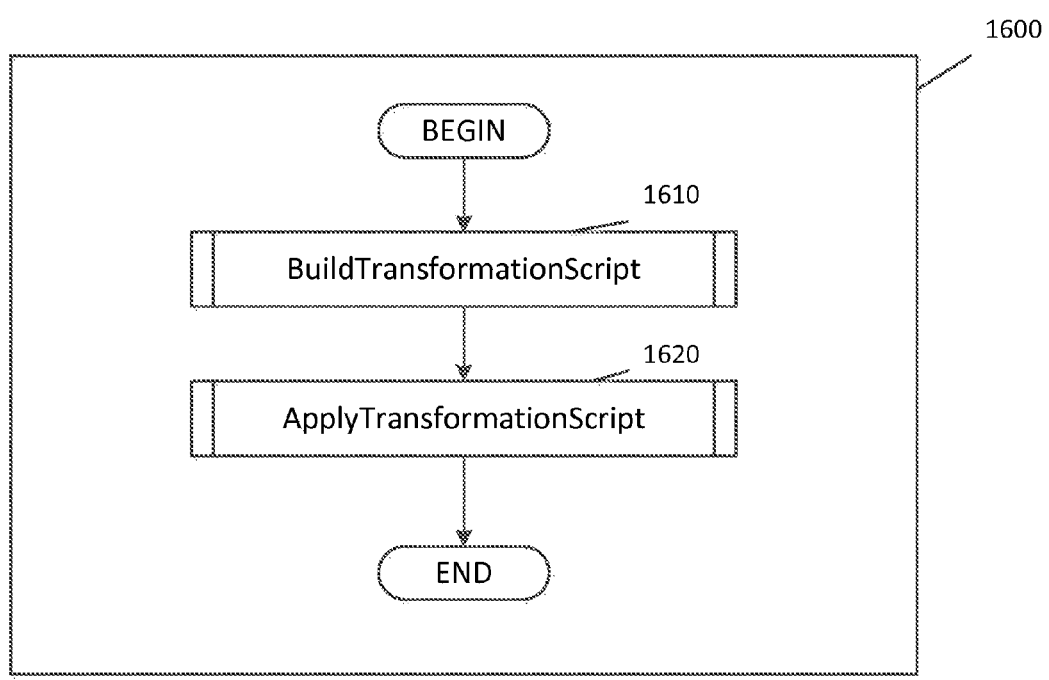
FIG. 15 is a flowchart of a Transformation Machine Process in accordance with a preferred embodiment of the present invention.

Referring to FIG. 15, a diagram of a Transformation Machine is shown. The Transformation Machine is designed to:

1. Build a Transformation Script (step 1610)
2. Apply the Transformation Script (step 1620)

The purpose of the "Apply Transformation Script" is to automate the user actions and change the text according to the Transformation Script built in the first step. This process can be presented in different ways: Opening a new window with a suggested Text, or opening a drop down window, or even presenting highlighted changed text within the same window. The goal is to create text whose content changes based on the Transformation script.

Figure 16:
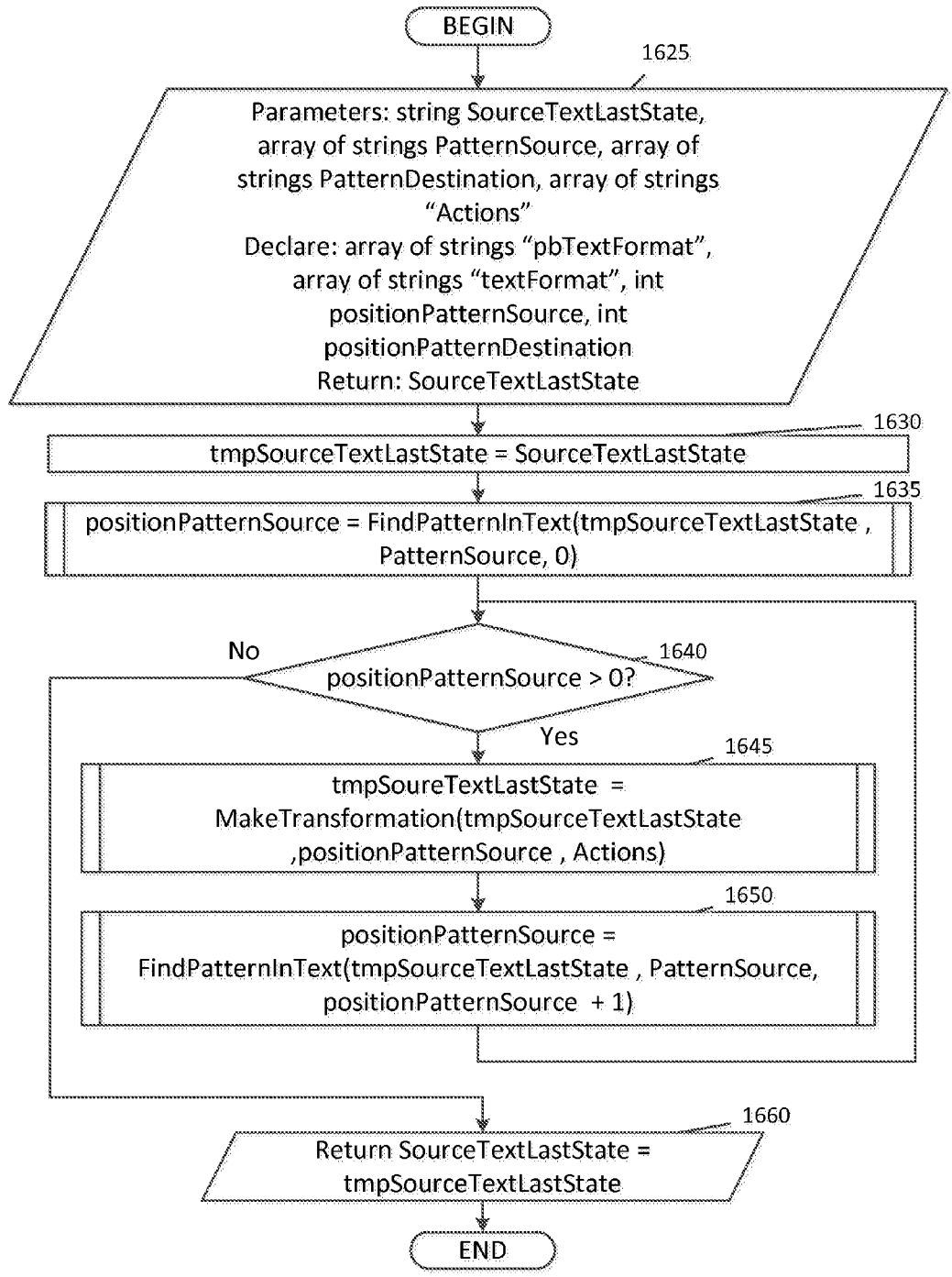
FIG. 16 is a flowchart of a Apply Transformation Script Process in accordance with a preferred embodiment of the present invention.

Referring to FIG. 16, a flowchart of the Apply Transformation Script function is shown.

The purpose of this function to identify which part of the text matches the source pattern, and then the "transformation" script is applied to all text regions so that the text region matches the destination pattern.

In step 1625, the function accepts several parameters: SourceTextLastState (or the last snapshot of the text. Basically this is the current text state within the text editor that the user is working on), an Array of strings "PatternSource", an array of strings "PatternDestination", and an array of strings "Actions". The function declares several variables: an array of strings "pbTextFormat", an array of strings "textFormat", an integer positionPatternSource, an integer positionPatternDestination, and a string tmpSourceTextLastState. The function returns "SourceTextLastState" which is modified according to the "Actions" array for each text region matching PatternSource, and "SourceTextLastStage" is then presented to the user. In step 1630, the function sets the variable tmpSourceTextLastState to the value of "SourceTextLastState". In step 1635, the function calls FindPatternInText that returns the position of the first instance of the text region where the text matches PatternSource within tmpSourceTextLastState. The function FindPatternInText takes three parameters: SourceText which contains the search, PatternSource, an array of "text format" which will be searched within SourceText, and starting position, where the search will be started from. The result of this function call is assigned to variable "positionPatternSource". In step 1640, the function checks if the positionPatternSource is greater than "0". If so, the function continues at step 1645. In step 1645, the function call MakeTransformation(tmpSourceTextLastState, positionPatternSource, Actions) is an actual implementation of the text changes within text "tmpSourceTextLastState" based on actions located in the array of "Actions".

In step 1650, the function makes another function call to FindPatternInText to find the next position for making changes. positionPatternSource=FindPatternInText(tmpSourceTextLastState, PatternSource, positionPatternSource+1) and continues the iteration of the loop. In step 1660, when all the instances of text matching to "PatternSource" have been changed, the new text: SourceTextLastState=tmpSourceTextLastState is returned and execution ends.

Figure 17A:
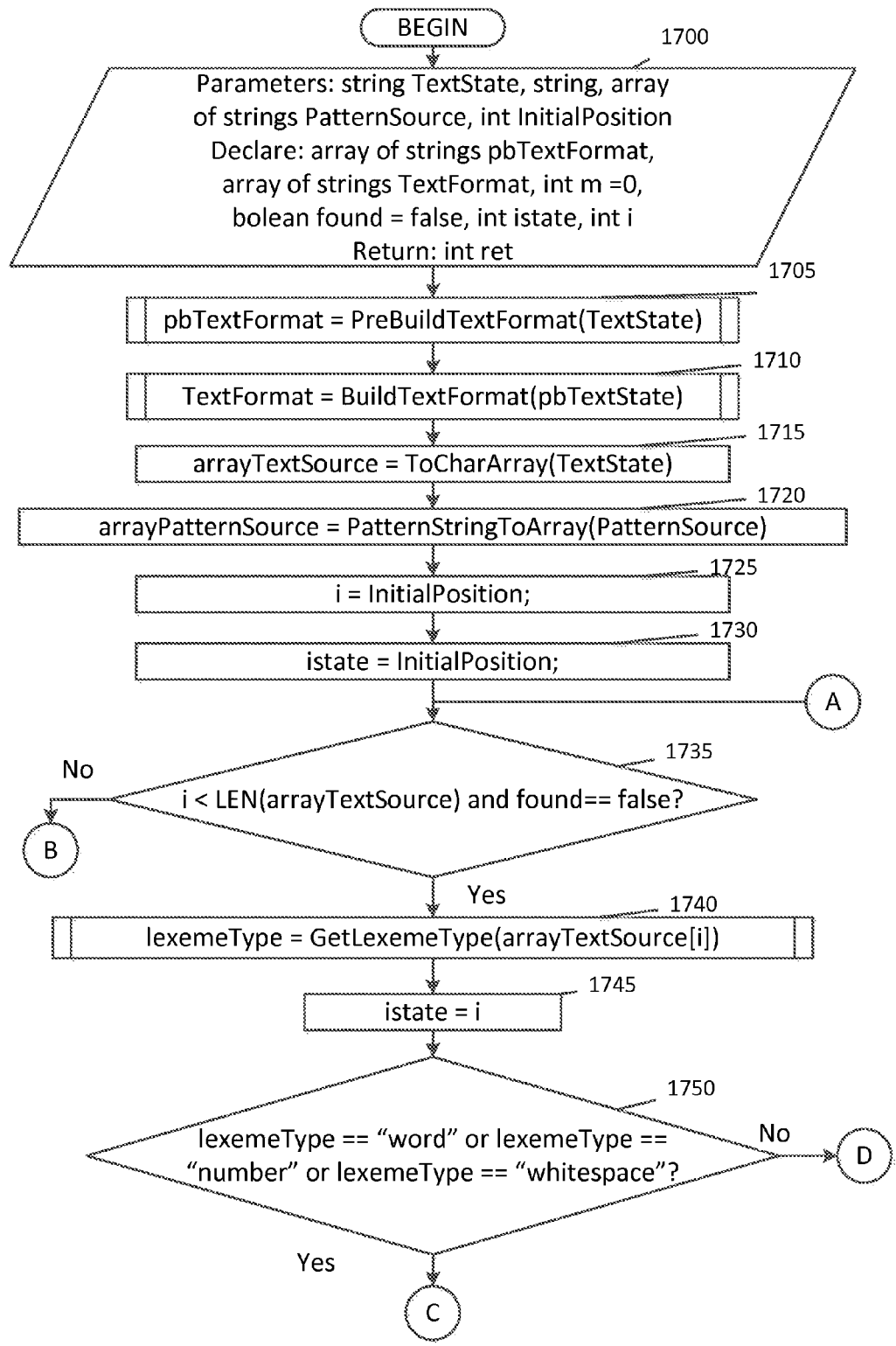
FIG. 17A is a flowchart of a Find Pattern In Text Process in accordance with a preferred embodiment of the present invention.

Referring to FIG. 17A, a flowchart of the Find Pattern In Text function is shown.

The purpose of this function is to find a text region that matches PatternSource. The search starts from a specific position in the text variable "InitialPosition". In step 1700, the function takes three parameters: TextState which is the current state of the text that the user is editing, an array of strings "PatternSource", and an integer "InitialPosition" within the "TextState". The function declares several variables: array of string pbTextFormat, array of string TextFormat, integer m=0, Boolean "found"=false, integer istate, integer i, and string lexemeType. The function returns integer "i".

In step 1705, the function sets the value of variable pbTextFormat to PreBuildTextFormat(TextState). In step 1710, the function sets the value of the variable TextFormat to BuildTextFormat(pbTextFormat). In step 1715, the function sets the value of variable "arrayTextSource" to ToCharArray (TextState).

In step 1725, the function sets the value of variable "i" to "InitialPosition".

In step 1730, the function sets the value of variable "istate" to "InitialPosition".

In step 1735, the function checks if the value of "i" is less than the length of arrayTextSource and if found is equal to "false". If so, the function continues at step 1740. Otherwise the function continues at the Connector "B". In step 1740, the function sets the value of variable "lexemeType" to the result of the function call GetLexemeType after passing one parameter to the function: arrayTextSource[i]. The function returns either "NUMBER", "WORD", "WHITESPACE" or "CHAR [x]", based on the passed parameter. In step 1745, the function sets the value of istate to the value of variable "i".

In step 1750, the function checks if lexemeType is a "WORD" or a "NUMBER" or a "WHITESPACE". The purpose of this loop is to scan through and pass all characters which are parts of the same lexemes.

Figure 17B:
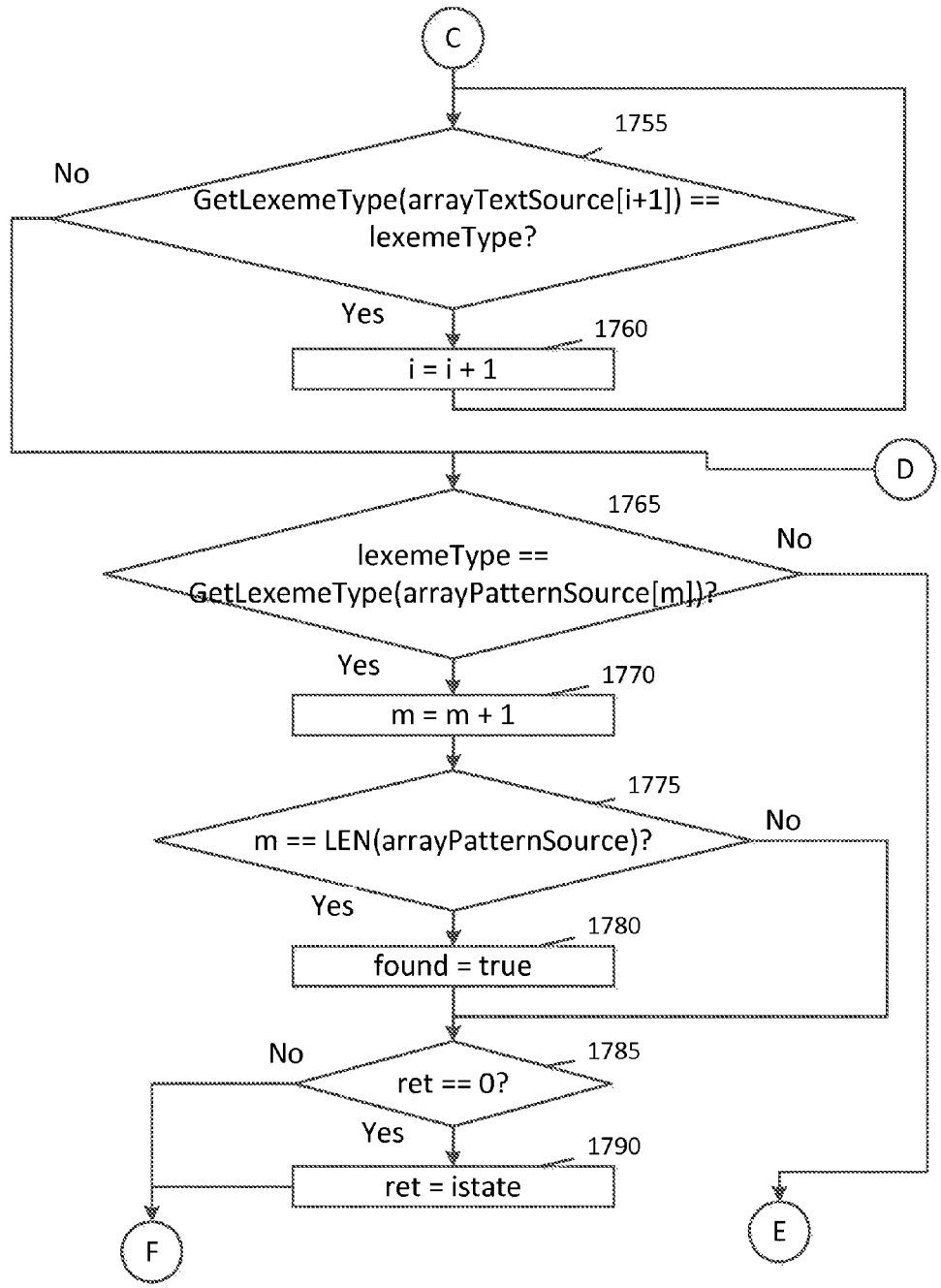
FIG. 17B is a flowchart of a Find Pattern In Text Process in accordance with a preferred embodiment of the present invention.

Referring to FIG. 17B, in step 1755 the function checks if the next character in arrayTextSource belongs to the same type as lexemeType. If this is true, then the loop continues until this become false. In step 1760, the function increments the value of variable "i" by value "1" and continues the loop. In step 1765, the function checks if lexemeType is equal to the result of GetLexemeType when the parameter arrayPatternSource[m] is passed to it. The purpose of this loop to scan through all elements of the arrayPatternSource and check if all elements in the current position match the elements in arrayPatternSource. If so, the function continues at step 1770. Otherwise the function continues at Connector E. In step 1770, the function increments the value of variable "m" by value "1". In step 1775, the function checks if m equals the length of arrayPatternSource. If so, then this is a match, and the function continues at step 1780. In step 1780, the function sets the variable "found" to value "true". In step 1785, the function checks if ret is equal to "0". If so, the function continues at step 1790. In step 1790, the function sets ret to the value of variable "istate".

Figure 17C:
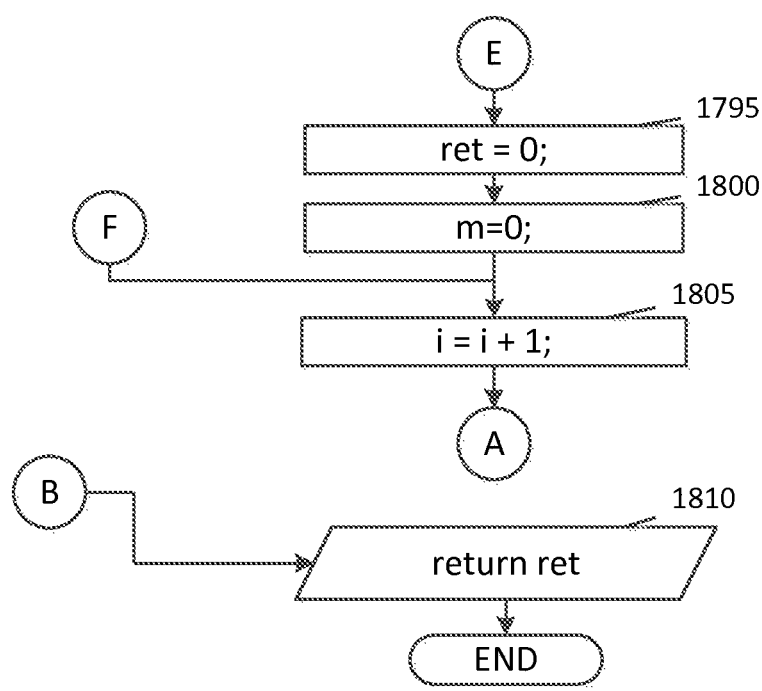
FIG. 17C is a flowchart of a Find Pattern In Text Process in accordance with a preferred embodiment of the present invention.

Referring to FIG. 17C, the function continues from Connector E. In step 1795, the function sets the value of "ret" to "0". In step 1800, the function sets the value of "m" to "0". In step 1805, the function increments the value of "i" by value "1" and continues the main loop through Connector A. In step 1810, the function continues from Connector B and returns the value of "ret", and ends.

Figure 18A:
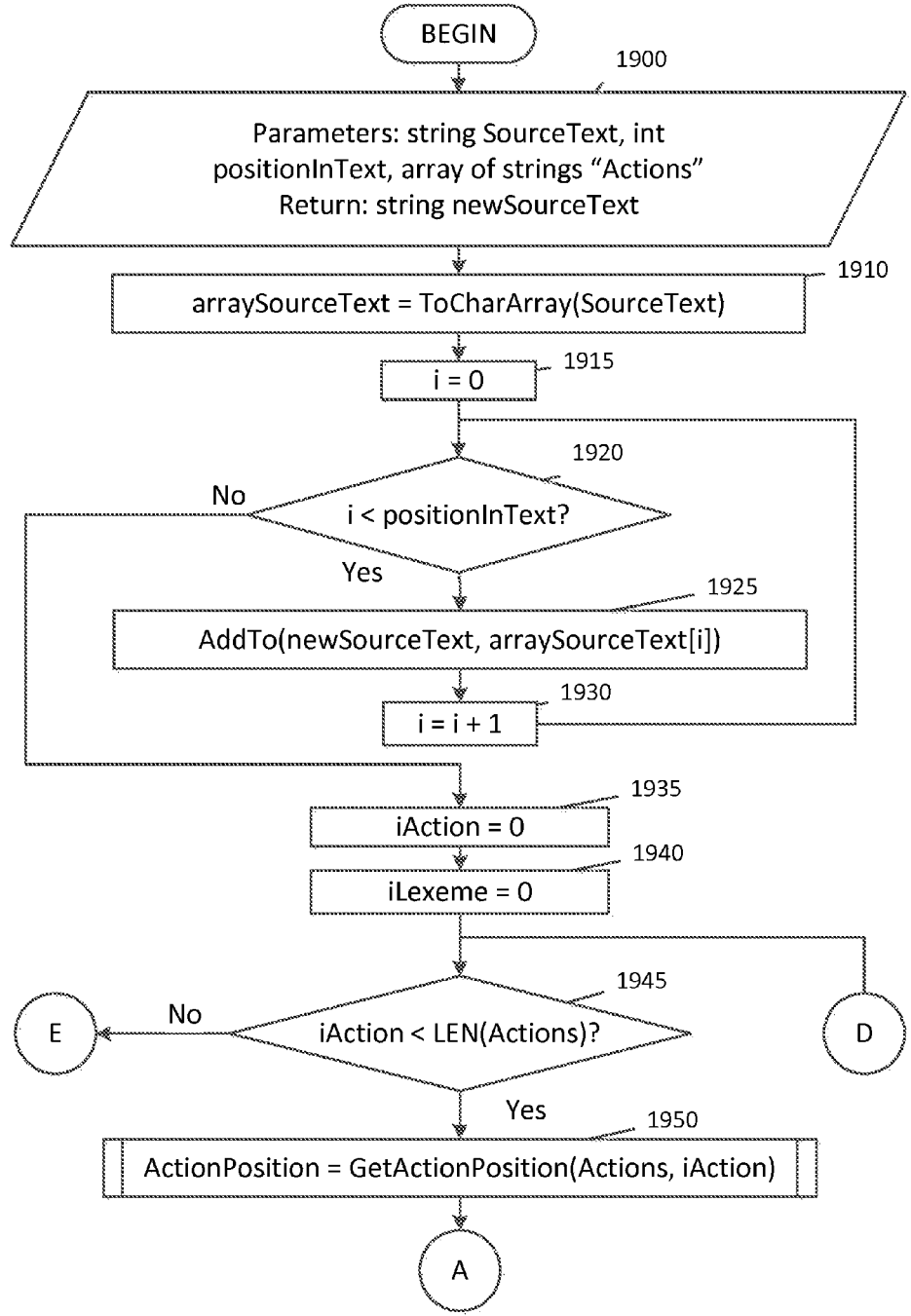
FIG. 18A is a flowchart of a Make Transformation Process in accordance with a preferred embodiment of the present invention.
Figure 18:
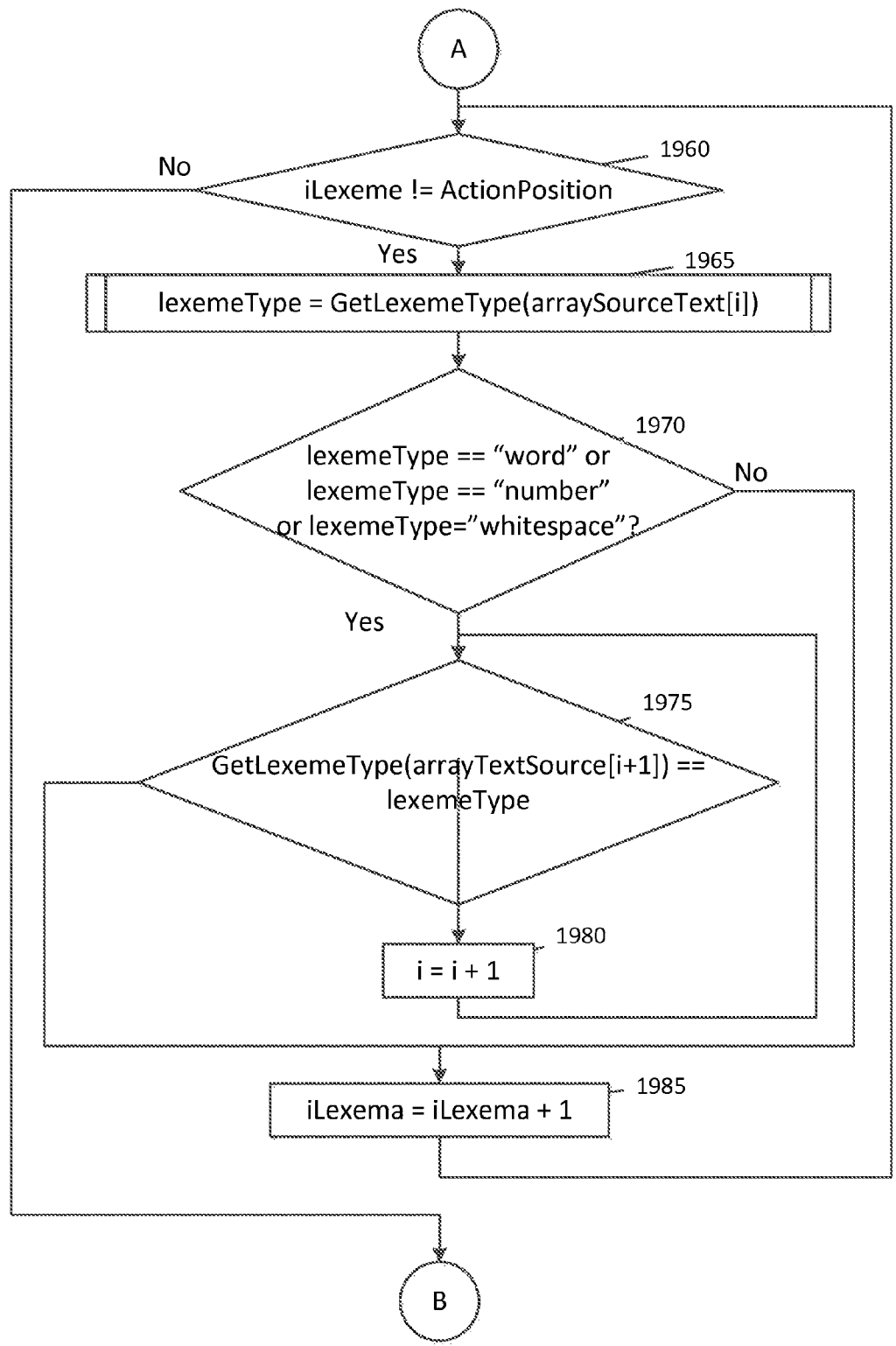
FIG. 18B is a flowchart of a Make Transformation Process in accordance with a preferred embodiment of the present invention.
FIG. 18C is a flowchart of a Make Transformation Process in accordance with a preferred embodiment of the present invention.
FIG. 18D is a flowchart of a Make Transformation Process in accordance with a preferred embodiment of the present invention.
Figure 18:
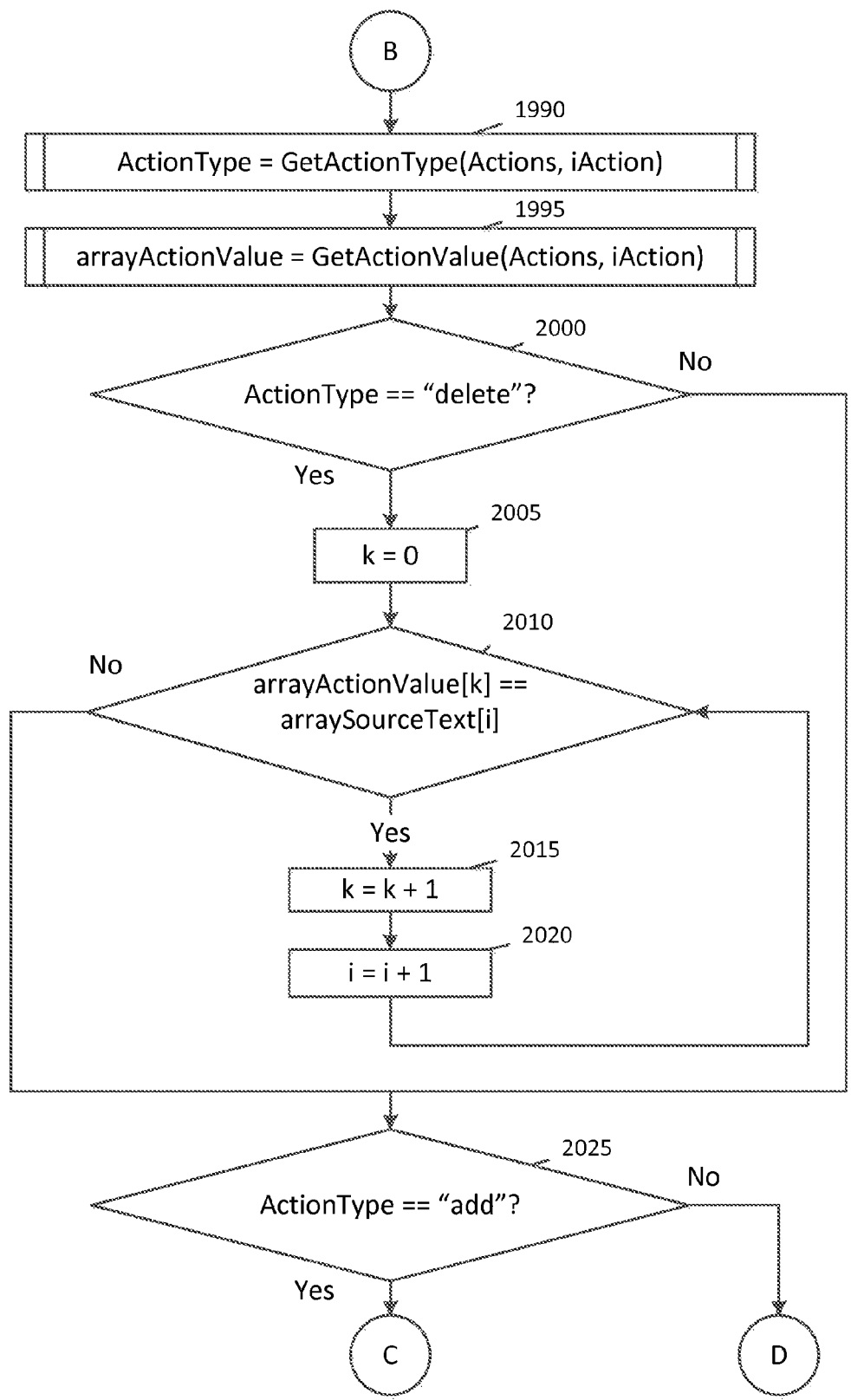
Figure 18:
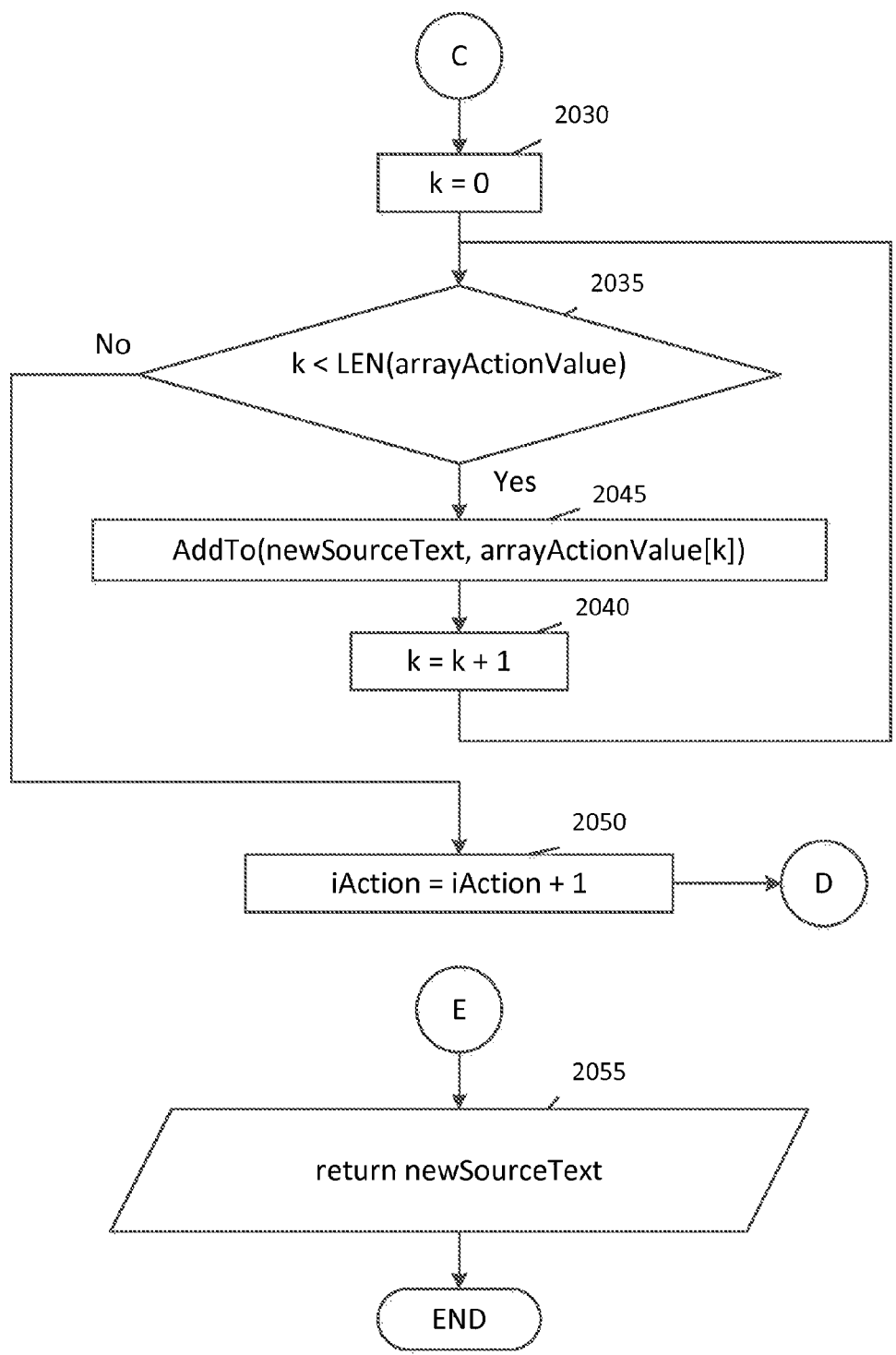

Referring to FIG. 18A, a flowchart of the Make Transformation function is shown. This function is designed to implement the transformation for text regions that match to "PatternSource" and needs to be "transformed" into text that matches to "PatternDestination". In step 1900, the function takes three parameters: string SourceText, integer positionInText, and array of string "Actions". The function declares several variables: integer "i", array of characters arraySourceText, integer iAction, integer iLexeme, and integer ActionPosition. The function returns string newSourceText.

In step 1910, the function sets the variable arraySourceText to an array of characters by calling the function ToCharArrya (SourceText), which splits the string "SourceText" into an array of characters. In step 1915, the function initializes variable "i" to "0". In step 1920, the function checks if the value of "i" is less than positionInText. If so, the function continues at step 1925. Otherwise the function jumps to step 1935. In step 1925, the function calls function AddTo(newSourceText, arraySourceText[i]) which adds one character of arraySourceText to string "newSourceText". In step 1930, the function increments the value of variable "i" by value "1". In step 1935, the function initializes the variable "iAction" to "0". In step 1940, the function initializes the value of "iLexeme" to value "0". In step 1945, the function checks if "iAction" is less than the length of array "Actions". If so, then the function continues at step 1950. Otherwise the function continues at Connector E. In step 1950, the function sets "ActionPosition" to the result of the function GetActionPosition(Actions, iAction). The Actions array stores these values: "Add at: [x]: content: [y]", so the function GetActionPosition extracts the value of [x].

Referring to FIG. 18B, in step 1960, the function checks if "iLexeme" is not equal "ActionPosition". If so, then the function continues at step 1965. Otherwise the function continues at Connector B. In step 1965, the all current lexemes should be skipped until "iLexeme" is equal to "ActionPosition". In step 1970, the function checks if lexemeType equals either "WORD" or "NUMBER" or "WHITESPACE". If so, the function continues at step 1975. Otherwise the function continues at step 1985. In step 1975, the function checks if lexemeType has not changed by checking if GetLexemeType (arryaTextSource[i+1]) is equal to lexemeType. If so, the function continues at step 1980. Otherwise the step continues at step 1985. In step 1980, the function increments the value of variable "i" by value "1" and continues the loop at step 1975. In step 1985, the the next lexeme has been reached, so "iLexeme" is increased by value "1" and the loop continues at step 1960.

Referring now to FIG. 18C, the function continues from Connector B. In step 1990, "iLexeme" has become equal to ActionPosition, so ActionType is set by calling function "GetActionType", which returns "delete" or "add" from the Actions array. In step 1995, the function gets the value of the content that needs to be added or deleted by calling function GetActionValue. The result of this call is assigned to variable "arrayActionValue".

In step 2000, the function checks if ActionType is equal to "delete". If so, the function continues at step 2005. Otherwise the function continues at step 2025. In step 2005, the function sets k equal to 0. Since "ActionType" is "delete" then all the characters that match arrayActionValue must be skipped in the original SourceText. Essentially this means ignoring the sequence of characters within SourceText and newSourceText which will not include this sequence of characters. In step 2010, the function checks if arrayActionValue[k] is equal to the array of arraySourceText[i]. If so, the function continues at step 2015. Otherwise the function continues at step 2025.

In step 2015, the function increments the value of variable "k" by "1". In step 2020, the function increments the value of variable "i" by "1" and continues the loop until arrayActionValue[k] is not equal to arraySourceText[i]. In step 2025, the function checks if the "ActionType" is "add". If so, the function continues at Connector C. Otherwise the function continues at Connector D.

Referring to FIG. 18D, the function continues from Connector C. In step 2030, if "ActionType" is "add" then the value of "k" is set to "0". In step 2035, the function checks if the value of variable "k" is less than the array "arrayActionValue". If so, the function continues at step 2045. Otherwise the function continues at step 2050.

In step 2045, the function calls AddTo "newSourceText" the value of arrayActionValue[k]. In step 2040, the function increments the value of variable "k" by "1" and continues the loop. In step 2050, the function increments the value of variable "iAction" by the value "1" and continues the loop through Connector "D".

In step 2055, the function continues from Connector E and returns the value of "newSourceText". The function then ends.

All or part of the method of the preferred embodiments of the present invention 10 may suitably and usefully be embodied in a logic apparatus, or a plurality of logic apparatus, comprising logic elements arranged to perform the steps of the method, and such logic elements may comprise hardware components, firmware components or a combination thereof.

The method and system 10 described above may also suitably be carried out fully or partially in software running on one or more processors (not shown in the figures), and the software may be provided in the form of one or more computer program elements carried on any suitable data-carrier (not shown in the figures) such as a magnetic or optical disk or the like. Channels for the transmission of data may likewise comprise storage media of all descriptions as well as signal-carrying media, such as wired or wireless signal-carrying media.

The present invention 10 may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In one alternative, the preferred embodiment of the present invention 10 may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention 10 may be realized in the form of a data carrier having functional data thereon, said functional data comprising functional computer data structures to, when loaded into a computer system and operated upon thereby, enable said computer system to perform all the steps of the method.

While the invention 10 has been described and illustrated in connection with preferred embodiments, many variations and modifications, evident to those skilled in this art, may be made without departing from the spirit and scope of the invention 10, and the invention 10 is thus not to be limited to the precise details of methodology or construction set forth above as such variations and modification are intended to be included within the scope of the invention 10.

What is claimed is:

1. A method for performing operations on structured text stored in a computing system, the method comprising: converting structured text in a computing system into strings of tokens representing text formats;
   identifying repeating patterns of said text formats within said structured computer text;
   determining pattern transformation procedures for transforming text strings within said structured computer text;
   building transformation algorithms for performing said pattern transformation procedures on said text strings;
   applying said algorithms to said text strings within said structured computer text that match a pattern;
   whereby said structured computer text is transformed from a first pattern to a second pattern;
   accepting a first input array of strings containing actual lexeme types; determining all possible text patterns within said first input array;
   building a third output array of strings representing text patterns in said structured computer text;
   accepting said third output array of strings representing text patterns in said structured computer text;
   removing all text patterns within said third output array containing text patterns of smaller size;
   removing all patterns within said third output array containing text patterns that can be generated by shifting elements in other text patterns.

2. The method according to claim 1, further including:
accepting a first input string of said structured computer text;
transforming said structured computer text to lexeme strings containing lexeme types;
building a first output array of said lexeme strings containing all the lexeme types of said first input string.

3. The method according to claim 2, further including:
accepting said first output array of lexeme type strings;
converting said lexeme types to their actual text types;
building a second output array of strings containing actual lexeme types.

4. The method according to claim 1, further including:
accepting a second input array of strings and a third input array of strings;
analyzing text patterns within said second input array and within said third input array;
identifying text source patterns to be transformed by said transformation algorithms;
identifying text destination patterns that said text source patterns will match after transformation by said transformation algorithms.

5. The method according to claim 1, further including:
accepting a first text source string and a first text destination string;
determining sub-strings that are common to said first text source string and said second text source string;
building said transformation algorithms that transform said source text source string to said text destination string.

6. The method according to claim 5, wherein said transformation algorithms can only add or delete characters at specific positions within said text source strings.

7. The method according to claim 1, further including:
accepting a fourth input array of strings and a fifth input array of strings;
identifying the source of text patterns within said fourth input array of strings and said fifth input array of strings.

8. The method according to claim 1, further including:
accepting sixth, seventh, eighth, and ninth input arrays of text strings;
interfacing with structured computer text edited by a text editing software application;
identifying regions within said structured computer text being currently edited by said text editing software application;
implementing said transformation algorithms to effect pattern transformations within said structured computer text.

9. A system for performing operations on structured computer text, the system comprising:
   a processor;
   a storage device;
   a user input device;
   a user display;
   and computer executable instructions operative on the processor for:
   converting structured text in a computing system into strings of tokens representing text formats;
   identifying repeating patterns of said text formats within said structured computer text;
   determining pattern transformation procedures for transforming text strings within said structured computer text;
   building transformation algorithms for performing said pattern transformation procedures on said text strings;
   applying said algorithms to said text strings within said structured computer text that match a pattern;
   whereby said structured computer text is transformed from a first pattern to a second pattern;
   accepting a first input array of strings containing actual lexeme types; determining all possible text patterns within said first input array;
   building a third output array of strings representing text patterns in said structured computer text;
   accepting said third output array of strings representing text patterns in said structured computer text;
   removing all text patterns within said third output array containing text patterns of smaller size;
   removing all patterns within said third output array containing text patterns that can be generated by shifting elements in other text patterns.

10. The system according to claim 9, further including:
    accepting a first input string of said structured computer text;
    transforming said structured computer text to lexeme strings containing lexeme types;
    building a first output array of said lexeme strings containing all the lexeme types of said first input string.

11. The system according to claim 10, further including:
    accepting said first output array of lexeme type strings;
    converting said lexeme types to their actual text types; building a second output array of strings containing actual lexeme types.

12. The system according to claim 9, further including:
    accepting a second input array of strings and a third input array of strings;
    analyzing text patterns within said second input array and within said third input array;
    identifying text source patterns to be transformed by said transformation algorithms;
    identifying text destination patterns that said text source patterns will match after transformation by said transformation algorithms.

13. The system according to claim 9, further including:
    accepting a first text source string and a first text destination string;
    determining sub-strings that are common to said first text source string and said second text source string;
    building said transformation algorithms that transform said source text source string to said text destination string.

14. The system according to claim 13, wherein said transformation algorithms can only add or delete characters at specific positions within said text source strings.

15. The system according to claim 9, further including:
    accepting a fourth input array of strings and a fifth input array of strings;
    identifying the source of text patterns within said fourth input array of strings and said fifth input array of strings.

16. The system according to claim 9, further including:
    accepting sixth, seventh, eighth, and ninth input arrays of text strings;
    interfacing with structured computer text edited by a text editing software application;
    identifying regions within said structured computer text being currently edited by said text editing software application;
    implementing said transformation algorithms to effect pattern transformations within said structured computer text.

* * * * *